United States Patent
Ogasawara et al.

(10) Patent No.: US 9,356,321 B2
(45) Date of Patent: May 31, 2016

(54) LEAD-ACID BATTERY

(71) Applicant: Panasonic Intellectual Property Management Co., Ltd., Osaka (JP)

(72) Inventors: Etsuko Ogasawara, Aichi (JP); Misaki Harada, Aichi (JP); Kazuhiro Sugie, Shizuoka (JP); Kenji Izumi, Shizuoka (JP); Yu Kojima, Shizuoka (JP); Kazuhiko Shimoda, Shizuoka (JP); Kazunari Ando, Aichi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/419,184

(22) PCT Filed: Oct. 22, 2013

(86) PCT No.: PCT/JP2013/006226
§ 371 (c)(1),
(2) Date: Feb. 2, 2015

(87) PCT Pub. No.: WO2014/097522
PCT Pub. Date: Jun. 26, 2014

(65) Prior Publication Data
US 2015/0200424 A1    Jul. 16, 2015

(30) Foreign Application Priority Data

Dec. 21, 2012  (JP) .................................. 2012-279604
Dec. 21, 2012  (JP) .................................. 2012-279617
Dec. 21, 2012  (JP) .................................. 2012-279700
Dec. 21, 2012  (JP) .................................. 2012-279710
Dec. 21, 2012  (JP) .................................. 2012-279725

(51) Int. Cl.
*H01M 10/06* (2006.01)
*H01M 10/12* (2006.01)
(Continued)

(52) U.S. Cl.
CPC .............. *H01M 10/12* (2013.01); *H01M 2/28* (2013.01); *H01M 4/14* (2013.01); *H01M 4/56* (2013.01);
(Continued)

(58) Field of Classification Search
CPC combination set(s) only.
See application file for complete search history.

(56) References Cited

U.S. PATENT DOCUMENTS 4,513,167 A * 4/1985 Brandstetter ............ H01G 4/38
136/205
4,725,516 A * 2/1988 Okada ................. H01M 10/342
429/204

(Continued)

FOREIGN PATENT DOCUMENTS

JP    37-030031 Y1    11/1962
JP    01-267965 A    10/1989
(Continued)

OTHER PUBLICATIONS

English Translation of Chinese Search Report issued in Chinese Application No. 201380037785.3 dated Sep. 1, 2015.
(Continued)

*Primary Examiner* — Jacob Marks
(74) *Attorney, Agent, or Firm* — McDermott Will & Emery LLP

(57) ABSTRACT

In a lead-acid battery including an electrode plate group housed in a cell chamber 6 with an electrolyte, each positive electrode plate includes a positive electrode grid made of lead or a lead alloy containing no antimony, and a positive electrode active material with which the positive electrode grid is filled. Each negative electrode plate includes a negative electrode grid made of lead or a lead alloy containing no antimony, a surface layer formed on a surface of the negative electrode grid and made of a lead alloy containing antimony, and a negative electrode active material with which the negative electrode grid is filled. A mass ratio $M_N/M_P$ falls within a range of 0.70 to 1.10, where $M_P$ represents the mass of the positive electrode active material per cell chamber, and $M_N$ represents the mass of the negative electrode active material per cell chamber.

13 Claims, 4 Drawing Sheets

(51) Int. Cl.
*H01M 2/28* (2006.01)
*H01M 4/14* (2006.01)
*H01M 4/56* (2006.01)
*H01M 4/73* (2006.01)
*H01M 4/68* (2006.01)
*H01M 10/08* (2006.01)
*H01M 4/57* (2006.01)
H01M 10/42 (2006.01)
H01M 2/24 (2006.01)
H01M 2/26 (2006.01)
H01M 2/30 (2006.01)
H01M 4/02 (2006.01)

(52) U.S. Cl.
CPC *H01M 4/57* (2013.01); *H01M 4/68* (2013.01); *H01M 4/685* (2013.01); *H01M 4/73* (2013.01); *H01M 10/08* (2013.01); *H01M 2/24* (2013.01); *H01M 2/266* (2013.01); *H01M 2/305* (2013.01); *H01M 2004/021* (2013.01); *H01M 2010/4292* (2013.01); *H01M 2220/20* (2013.01); *Y02E 60/126* (2013.01)

(56) References Cited

U.S. PATENT DOCUMENTS

| | | |
|---|---|---|
| 6,037,081 A | 3/2000 | Kashio et al. |
| 6,225,005 B1 | 5/2001 | Shiomi et al. |
| 6,291,104 B1* | 9/2001 | Yoshihara ............... H01M 4/73 29/2 |
| 2001/0000239 A1 | 4/2001 | Shiomi et al. |
| 2002/0090554 A1* | 7/2002 | Chen ...................... H01M 4/20 429/241 |
| 2006/0292448 A1* | 12/2006 | Gyenge ................... H01M 4/14 429/236 |
| 2007/0160910 A1 | 7/2007 | Sugie et al. |
| 2007/0184349 A1 | 8/2007 | Yasuda et al. |
| 2008/0107960 A1 | 5/2008 | Furukawa et al. |
| 2008/0131774 A1 | 6/2008 | Tsuboi |
| 2008/0241686 A1 | 10/2008 | Sugie et al. |
| 2010/0203362 A1* | 8/2010 | Lam ........................ H01M 4/56 429/7 |
| 2011/0318629 A1* | 12/2011 | Ho ....................... H01M 2/1606 429/144 |

FOREIGN PATENT DOCUMENTS

| | | |
|---|---|---|
| JP | 06-140043 A | 5/1994 |
| JP | 07-094205 A | 4/1995 |
| JP | 08-069811 A | 3/1996 |
| JP | 10-188963 A | 7/1998 |
| JP | 2001-110426 A | 4/2001 |
| JP | 2003-031225 A | 1/2003 |
| JP | 2003-151617 A | 5/2003 |
| JP | 2003-187790 A | 7/2003 |
| JP | 2006-004636 A | 1/2006 |
| JP | 2006-114416 A | 4/2006 |
| JP | 2006-114417 A | 4/2006 |
| JP | 2006-156371 A | 6/2006 |
| JP | 2007-035339 A | 2/2007 |
| JP | 2007-066558 A | 3/2007 |
| JP | 2007-305368 A | 11/2007 |
| WO | 2012-153464 A1 | 11/2012 |

OTHER PUBLICATIONS

English Translation of German Office Action issued in German Application No. 11 2013 003 880.3, dated Nov. 9, 2015.
International Search Report issued in PCT/JP2013/006226, dated Dec. 10, 2013, with English translation.

* cited by examiner

LEAD-ACID BATTERY

RELATED APPLICATIONS

This application is the U.S. National Phase under 35 U.S.C. §371 of International Application No. PCT/JP2013/006226, filed on Oct. 22, 2013, which in turn claims the benefit of Japanese Application No. 2012-279604, filed on Dec. 21, 2012, Japanese Application No. 2012-279617, filed on Dec. 21, 2012, Japanese Application No. 2012-279700, filed on Dec. 21, 2012, Japanese Application No. 2012-279710, filed on Dec. 21, 2012 and Japanese Application No. 2012-279725, filed on Dec. 21, 2012, the disclosures of which Applications are incorporated by reference herein.

TECHNICAL FIELD

The present invention relates to lead-acid storage batteries used for idling stop vehicles.

BACKGROUND ART

The fuel consumption of an idling stop vehicle can be improved in such a manner that an engine is turned off while the vehicle stops. However, since a lead-acid battery supplies power to all of an air conditioner, a fan, etc. during idling stop, the lead-acid battery is likely to be in an insufficiently-charged state. In order to overcome the insufficiently-charged state, a high charge acceptance is required for the lead-acid battery so that the lead-acid battery can be more charged for a short period of time. Moreover, since the idling stop vehicle frequently repeats ON/OFF of the engine, succeeding discharging is performed before lead dioxide and lead are, by charging. recovered from lead sulfate generated by preceding discharging. Thus, the life of the lead-acid battery is likely to decrease. For such reasons, a high durability is also required for the lead-acid battery in order to overcome a decrease in life.

In order to improve the charge acceptance of the lead-acid battery, Patent Document 1 describes a lead-acid battery including an electrolyte containing aluminum ions. The aluminum ions exhibit the effect of reducing, in discharging, coarsening of lead sulfate generated at positive and negative electrodes, thereby improving the charge acceptance of the lead-acid battery.

Patent Document 1 also describes that a lead-antimony based alloy layer formed on a surface of a negative electrode grid can reduce a decrease in thickness of an ear part of the negative electrode in an idling stop mode.

In order to improve the durability of the lead-acid battery, Patent Document 2 describes a lead-acid battery in which a lead alloy layer containing antimony is formed on a surface of a negative electrode grid containing no antimony. The lead alloy layer containing antimony exhibits the effect of efficiently performing charge recovery of a negative electrode plate, thereby improving the durability of the lead-acid battery.

Patent Document 3 describes a lead-acid battery in which a negative electrode grid containing no antimony is filled with a negative electrode active material containing antimony and the mass ratio of the negative electrode active material to a positive electrode active material falls within a range of 0.7 to 1.3. The antimony added to the negative electrode active material exhibits the effect of decreasing a hydrogen over-voltage of a negative electrode, thereby improving the charge acceptance of the negative electrode active material. Moreover, since the mass ratio of the negative electrode active material to the positive electrode active material falls within a range of 0.7 to 1.3, elution of the antimony from the negative electrode active material to the electrolyte in over-discharging of the lead-acid battery and deposition of the antimony on an ear part of the negative electrode can be reduced. This can reduce corrosion of the ear part of the negative electrode.

Patent Document 4 discloses that, in order to overcome a short life caused by an increase in frequency of discharging due to the use conditions where the frequency of temporary stop accompanied by idling stop is high, the density of a positive electrode active material is 3.5 to 4.5 g/cc, the specific gravity of an electrolyte is 1.240 to 1.260 (20° C.), and the amount of carbon which is an additive of a negative electrode plate is 0.5 to 2.0% per mass of a negative electrode active material.

Patent Document 5 describes a control valve type lead-acid battery in which the mass ratio of sulfuric acid in an electrolyte to a positive electrode active material falls within a predetermined range and sodium tetraborate is added to the electrolyte. This reduces deposition of dendrites of lead by re-charging after over-discharging, thereby reducing or preventing internal short-circuit.

Patent Document 6 describes the technique of reducing lead ion generation accompanied by a decrease in sulfuric acid concentration in over-discharging by adding alkali metal sulfate such as $Na_2SO_4$ to an electrolyte and reducing or preventing occurrence of short-circuit between positive and negative electrodes by growing $PbSO_4$ on the negative electrode in charging. The $Na_2SO_4$ added to the electrolyte exhibits the effect of reducing a decrease in conductivity of the electrolyte due to a decrease in sulfuric acid concentration in over-discharging and improving charge recovery after over-discharging.

CITATION LIST

Patent Document

PATENT DOCUMENT 1: Japanese Unexamined Patent Publication No. 2006-004636
PATENT DOCUMENT 2: Japanese Unexamined Patent Publication No. 2006-156371
PATENT DOCUMENT 3: Japanese Unexamined Patent Publication No. 2006-114417
PATENT DOCUMENT 4: Japanese Unexamined Patent Publication No. 2003-151617
PATENT DOCUMENT 5: Japanese Unexamined Patent Publication No. 2007-035339
PATENT DOCUMENT 6: Japanese Unexamined Patent Publication No. H01-267965

SUMMARY OF THE INVENTION

Technical Problem

Lead-acid batteries used for idling stop vehicles are likely to be in an insufficiently-charged state. Thus, for the purpose of reducing or preventing over-discharging of the lead-acid batteries, fail-safe mechanisms configured not to cause the lead-acid batteries to discharge when the state of charge (SOC) reaches equal to or lower than a predetermined value (e.g., 60%) may be provided in the idling stop vehicles.

FIG. 1 is graphs schematically showing an SOC when discharging and charging of a lead-acid battery are repeated in an idling stop vehicle. The line graphs shown in FIG. 1 show the pattern in which the process at which, while the vehicle stops, the SOC decreases by discharging of the lead-acid battery and the process at which, after the vehicle is re-started, the lead-acid battery is charged to recover the SOC are repeated.

With a high charge acceptance of the lead-acid battery, the SOC of the lead-acid battery is recovered to about 100% while the vehicle is running Thus, as shown in the line graph A of FIG. 1, even if the idling stop vehicle runs for a long period of time, charging/discharging of the lead-acid battery can be repeated.

However, without a high charge acceptance of the lead-acid battery, charging cannot be, as shown in the line graph B of FIG. 1, sufficiently performed while the vehicle is running. If the vehicle stops in the state in which the SOC is not recovered to 100%, the SOC significantly decreases by discharging. If such charging/discharging are repeated, the SOC gradually continues to decrease. In this case, if a fail-safe mechanism is provided in the idling stop vehicle, when the SOC reaches equal to or lower than a predetermined value (e.g., 60%), the fail-safe mechanism is activated to stop discharging.

Particularly in the case where a running distance per drive is short (hereinafter referred to as a "short-distance drive"), charging cannot be sufficiently performed while the vehicle is running, and the SOC is not recovered to 100%. This leads to frequent activation of the fail-safe mechanism. Moreover, in the case where the vehicle is used for the short-distance drive only on weekends, the SOC further decreases due to self-discharging and dark current during stoppage of the vehicle, and therefore, the fail-safe mechanism is activated more frequently. However, in the past, there are no lead-acid storage batteries which are applicable to idling stop vehicles used in the foregoing short-distance drive mode and which have both of a sufficient charge acceptance and a sufficient durability (life characteristic).

Suppose that the lead-acid battery recovered after being temporarily in an over-discharging state is re-used in the short-distance drive mode to repeat charging/discharging. With poor charge recovery, the balance between charging and discharging cannot be achieved, and therefore, the state in which the fail-safe mechanism is activated frequently occurs again. In the worst case, idling stop is constantly disabled. In addition, since the lead-acid battery is used with a low SOC, there is a possibility that the life of the lead-acid battery is shortened due to development of sulfation. However, in the past, there are no lead-acid storage batteries which are applicable to idling stop vehicles used in the foregoing short-distance drive mode and which have all of a sufficient charge acceptance, a sufficient durability (life characteristic), and a sufficient charge recovery after over-discharging.

The present invention has been made in view of the foregoing, and is mainly intended to provide a lead-acid battery which is applicable to an idling stop vehicle used in a short-distance drive mode and which have all of a sufficient charge acceptance, a sufficient durability (life characteristic), and a sufficient charge recovery after over-discharging.

Solution to the Problem

A lead-acid battery of the present invention is intended for a lead-acid battery in which at least one electrode plate group formed such that a plurality of positive electrode plates and a plurality of negative electrode plates are stacked on each other with a separator being interposed between adjacent ones of the positive and negative electrode plates is housed in at least one cell chamber together with an electrolyte. Each positive electrode plate includes a positive electrode grid made of lead or a lead alloy containing no antimony, and a positive electrode active material with which the positive electrode grid is filled. Each negative electrode plate includes a negative electrode grid made of lead or a lead alloy containing no antimony, a surface layer formed on a surface of the negative electrode grid and made of a lead alloy containing antimony, and a negative electrode active material with which the negative electrode grid is filled. A mass ratio $M_N/M_P$ falls within a range of 0.70 to 1.10, where $M_P$ represents the mass of the positive electrode active material per cell chamber, and $M_N$ represents the mass of the negative electrode active material per cell chamber.

In a preferable embodiment, each positive electrode plate includes a positive electrode grid made of lead or a lead alloy containing no antimony, a positive electrode surface layer formed on a surface of the positive electrode grid and made of a lead alloy containing antimony, and a positive electrode active material with which the positive electrode grid is filled. Each negative electrode plate includes a negative electrode grid made of lead or a lead alloy containing no antimony, a negative electrode surface layer formed on a surface of the negative electrode grid and made of a lead alloy containing antimony, and a negative electrode active material with which the negative electrode grid is filled. An area PS of the positive electrode surface layer on the surface of the positive electrode grid is larger than an area NS of the negative electrode surface layer on the surface of the negative electrode grid.

In another preferable embodiment, each positive electrode plate includes a positive electrode grid made of lead or a lead alloy, and a positive electrode active material with which the positive electrode grid is filled. The density of the positive electrode active material is equal to or higher than 3.6 g/ml and equal to or lower than 4.8 g/ml, or the total pore volume of the positive electrode active material is equal to or greater than 0.06 ml/g and equal to or less than 0.18 ml/g Some of the negative electrode plates are arranged respectively on both sides in the electrode plate group, and each negative electrode plate is housed in the separator formed in a bag shape.

In still another preferable embodiment, each positive electrode plate includes a positive electrode grid made of lead or a lead alloy containing no antimony, and a positive electrode active material with which the positive electrode grid is filled. Each negative electrode plate includes a negative electrode grid made of lead or a lead alloy containing no antimony, a surface layer formed on a surface of the negative electrode grid and made of a lead alloy containing antimony, and a negative electrode active material with which the negative electrode grid is filled. A mass ratio $M_S/M_P$ falls within a range of 0.50 to 0.74, where $M_P$ represents the mass of the positive electrode active material per cell chamber, and $M_S$ represents the mass of sulfuric acid contained in the electrolyte.

In still another preferable embodiment, each positive electrode plate includes a positive electrode grid made of lead or a lead alloy containing no antimony, and a positive electrode active material with which the positive electrode grid is filled. Each negative electrode plate includes a negative electrode grid made of lead or a lead alloy containing no antimony, a surface layer formed on a surface of the negative electrode grid and made of a lead alloy containing antimony, and a negative electrode active material with which the negative electrode grid is filled. Some of the negative electrode plates housed respectively in the separators formed in a bag shape are arranged respectively on both sides in the electrode plate group. The electrolyte contains sodium ions at a range of 0.01 to 0.45 mol/L.

Advantages of the Invention

According to the present invention, a lead-acid battery which is applicable to an idling stop vehicle used in a short-distance drive mode and which have all of a sufficient charge acceptance, a sufficient durability (life characteristic), and a sufficient charge recovery after over-discharging can be provided.

DESCRIPTION OF EMBODIMENTS

Embodiments of the present invention will be described below in detail with reference to drawings. Note that the present invention is not limited to the embodiments described below. Modifications can be optionally made without departing from the scope achieving the advantages of the present invention. Further, the embodiment(s) can be combined with other embodiment(s).

First Embodiment

Figure 1:
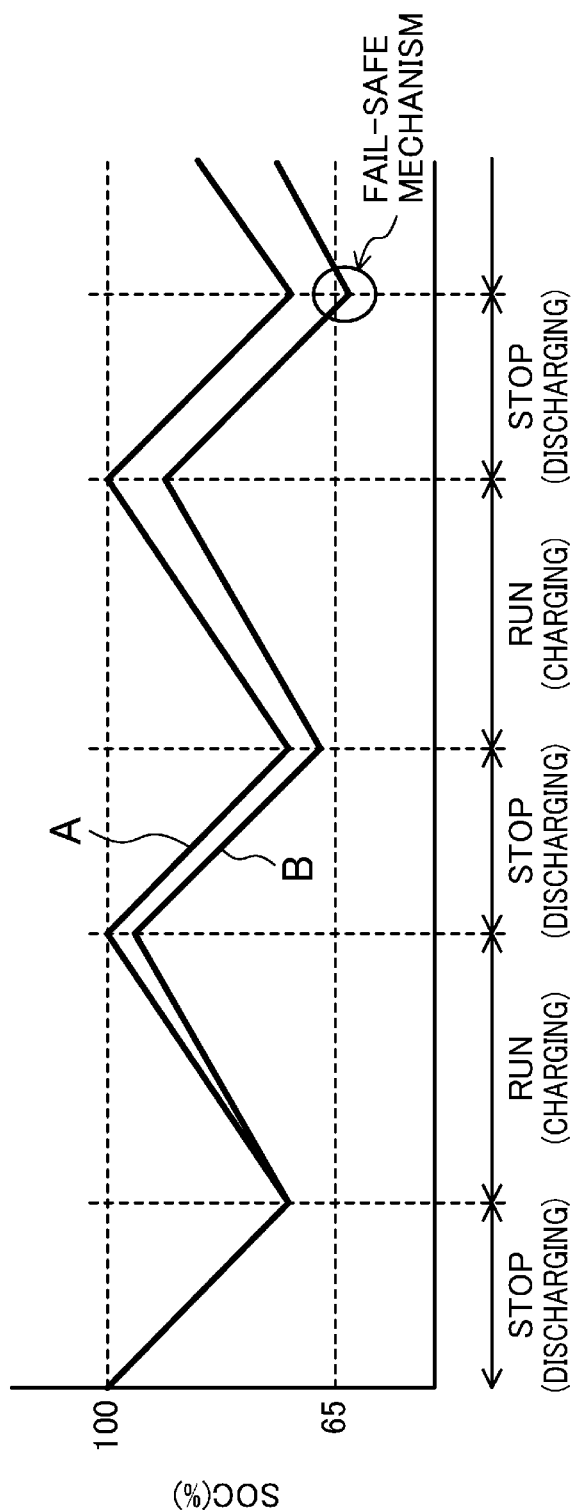
FIG. 1 is graphs schematically showing an SOC when discharging and charging of a lead-acid battery are repeated in an idling stop vehicle.
Figure 2:
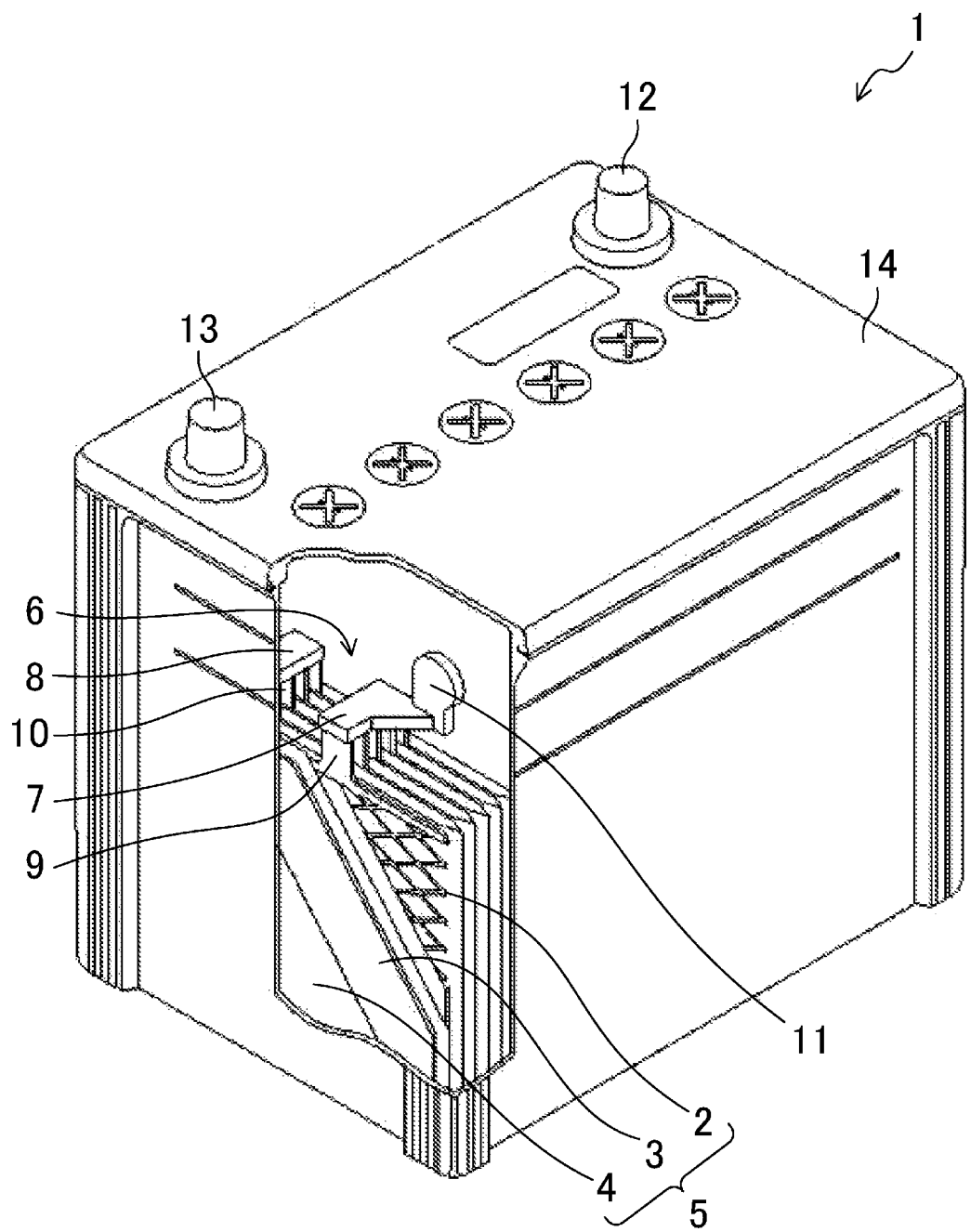
FIG. 2 is a schematic view illustrating an outline configuration of a lead-acid battery of an embodiment of the present invention.

FIG. 2 is a schematic view illustrating an outline configuration of a lead-acid battery 1 of a first embodiment of the present invention.

Referring to FIG. 2, in the lead-acid battery 1, an electrode plate group 5 in which a plurality of positive electrode plates 2 and a plurality of negative electrode plates 3 are stacked on each other with a separator 4 being interposed between adjacent ones of the positive and negative electrode plates 2, 3 is housed in each cell chamber 6 together with an electrolyte.

The positive electrode plate 2 includes a positive electrode grid and a positive electrode active material with which the positive electrode grid is filled, and the negative electrode plate 3 includes a negative electrode grid and a negative electrode active material with which the negative electrode grid is filled. Note that the positive and negative electrode grids of the present embodiment are made of lead or a lead alloy containing no antimony (Sb), such as a Pb—Ca alloy, a Pb—Sn alloy, or a Pb—Sn—Ca alloy.

The positive electrode plates 2 are, at ear parts 9 of the positive electrode grids, connected together in parallel by a positive electrode strap 7, and the negative electrode plates 3 are, at ear parts 10 of the negative electrode grids, connected together in parallel by a negative electrode strap 8. The electrode plate groups 5 housed respectively in the cell chambers 6 are connected together in series by a connector 11. The positive electrode strap 7 and the negative electrode strap 8 housed respectively in the cell chambers 6 positioned respectively at both ends of the lead-acid battery 1 are welded respectively to poles (not shown), and each pole is welded to a corresponding one of positive and negative electrode terminals 12, 13 arranged on a cover 14.

In the present embodiment, a surface layer (not shown) made of a lead alloy containing antimony is formed on a surface of the negative electrode grid. The lead alloy containing antimony exhibits the effect of decreasing a hydrogen overvoltage, thereby improving the charge acceptance of the lead-acid battery 1. Note that the surface layer is preferably made of a Pb—Sb based alloy containing antimony at a content of 1.0 to 5.0 mass %.

Moreover, in the present embodiment, a mass ratio $M_N/M_P$ is set within a range of 0.70 to 1.10 and preferably a range of 0.80 to 1.00, where "$M_P$" represents the mass of the positive electrode active material per cell chamber 6 and "$M_N$" represents the mass of the negative electrode active material per cell chamber 6. When the mass ratio $M_N/M_P$ of the negative electrode active material to the positive electrode active material falls within the foregoing range, a life characteristic can be maintained, and the charge acceptance of the lead-acid battery 1 can be improved. Thus, even if the lead-acid battery 1 is applied to an idling stop vehicle used in a short-distance drive mode, activation of a fail-safe mechanism can be reduced.

In the present embodiment, the electrolyte contains sodium ions at a range of 0.01 to 0.45 mol/L and more preferably a range of 0.03 to 0.28 mol/L. The sodium ions contained in the electrolyte exhibit the effect of improving charge recovery after over-discharging, thereby further improving the charge acceptance of the lead-acid battery 1. Thus, even if the lead-acid battery 1 is applied to the idling stop vehicle used in the short-distance drive mode, activation of the fail-safe mechanism can be more effectively reduced.

In the present embodiment, W/L preferably falls within a range of 0.50 to 0.80, where "L" represents the inner dimension of the cell chamber 6 in the stacking direction of the electrode plate groups 5 and "W" represents the total thickness of the positive and negative electrode plates 2, 3. The value of W/L shows the size of the clearance between the positive electrode plate 2 and the negative electrode plate 3, i.e., the indicator for amount of the electrolyte entering such a clearance. When the value of W/L falls within a range of 0.50 to 0.80, the charge acceptance of the lead-acid battery 1 is further improved. Thus, even if the lead-acid battery 1 is applied to the idling stop vehicle used in the short-distance drive mode, activation of the fail-safe mechanism can be more effectively reduced.

In the present embodiment, it is preferable that the negative electrode plates 3 are arranged respectively on both sides in the electrode plate group 5 and are each housed in a corresponding one of the bag-shaped separators 4 and that a plurality of ribs for forming a certain clearance between the negative electrode plate 3 and the separator 4 are formed at an inner part of each separator 4. This allows the electrolyte to enter such a clearance in each of the negative electrode plates 3 arranged respectively on both sides in the electrode plate group 5, thereby further improving the charge acceptance of the lead-acid battery 1. Thus, even if the lead-acid battery 1 is applied to the idling stop vehicle used in the short-distance drive mode, activation of the fail-safe mechanism can be more effectively reduced.

The foregoing advantages can be achieved as long as the ribs are formed at least at the separators 4 each housing a corresponding one of the negative electrode plates 3 arranged respectively on both sides in the electrode plate group 5. However, a plurality of ribs may be, needless to say, formed at the separators 4 each housing a corresponding one of all of the negative electrode plates 3. If the lead-acid battery 1 includes only a single cell chamber 6, a container of the lead-acid battery 1 may also serve as the cell chamber 6.

First Example

The configuration and advantages of the present invention will be further described below with reference to examples of the present embodiment. Note that the present invention is not Limited to these Examples.

(1) Formation of Lead-Acid Battery

Lead-acid batteries 1 formed in the present examples are liquid lead-acid batteries having a D23L size specified in JIS D 5301. Seven positive electrode plates 2 and eight negative electrode plates 3 are housed in each cell chamber 6, and each negative electrode plate 3 is housed in a bag-shaped separator 4 made of polyethylene.

Each positive electrode plate 2 was formed in such a manner that lead oxide powder is mixed with sulfuric acid and purified water to prepare a paste and an expanded grid made of a material having the composition of a calcium-based lead alloy is filled with the paste.

Each negative electrode plate 3 was formed in such a manner that an organic additive etc. are added to lead oxide powder, the resultant is mixed with sulfuric acid and purified water to prepare a paste, and an expanded grid made of a material having the composition of a calcium-based lead alloy is filled with the paste.

After the formed positive electrode plates 2 and the formed negative electrode plates 3 were matured and dried, the negative electrode plates 3 were housed respectively in bag-shaped separators 4 made of polyethylene, and then, the negative electrode plates 3 and the positive electrode plates 2 were alternately stacked on each other. As a result, an electrode plate group 5 in which the seven positive electrode plates 2 and the eight negative electrode plates 3 are stacked on each other with the separator 4 being interposed between adjacent ones of the positive and negative electrode plates 2, 3 was formed. The electrode plate group 5 was housed in each of the six cell chambers 6, and a lead-acid battery 1 in which six cells are connected together in series was formed.

An electrolyte containing diluted sulfuric acid at a density of 1.28 g/cm$^3$ was introduced into the lead-acid battery 1, and then, chemical conversion was performed in a container. As a result, a 12V 48 Ah lead-acid battery 1 was formed.

(2) Evaluation on Characteristics of Lead-Acid Battery (2-1) Evaluation on Life Characteristic For the formed lead-acid battery, charging/discharging intended for idling stop were repeated to evaluate the life characteristic of the lead-acid battery.

A life characteristic test was conducted under the following conditions substantially according to the storage battery association standard (SBA S 0101). Note that an environmental temperature was 25° C.±2° C.

(A) After discharging is performed at a discharge current of 45 A for 59 seconds, discharging is performed at 300 A for 1 second.

(B) Subsequently, charging is performed with a charge voltage of 14.2 V (a limited current of 100 A) for 60 seconds.

(C) The lead-acid battery is left uncontrolled for 48 hours every 3600 cycles, the discharging (A) and the charging (B) being counted as one cycle, and then, the cycles are resumed.

The foregoing cycles were repeated, and the number of cycles when the discharge voltage reached less than 7.2 V was taken as the life characteristic. Note that, in the foregoing test, water refilling was not performed till 30000 cycles.

(2-2) Evaluation on Characteristic in Short-Distance Drive Mode

For the formed lead-acid battery 1, charging/discharging intended for the short-distance drive mode were repeated to evaluate the characteristic of the lead-acid battery in the short-distance drive mode. Note that an environmental temperature was 25° C.±2° C.

(A) After discharging is performed at a discharge current of 9.6 A for 2.5 hours, the lead-acid battery is left uncontrolled for 24 hours.

(B) Discharging is performed at a discharge current of 20 A for 40 seconds.

(C) Charging is performed with a charge voltage of 14.2 V (a limited current of 50 A) for 60 seconds.

(D) After the discharging (B) and the charging (C) are repeated 18 times, discharging is performed at a discharge current of 20 mA for 83.5 hours.

(E) Cycles are repeated 20 times, the discharging (B), the charging (C), and the discharging (D) being counted as a single cycle.

The SOC of the lead-acid battery after 20 cycles was measured, and such a value was taken as the characteristic in the short-distance drive mode.

Example 1-1

Batteries A1 to A7 were formed, in each of which a surface layer made of a lead alloy containing antimony is formed on a surface of a negative electrode grid and a mass ratio $M_N/M_P$ falls within a range of 0.65 to 1.15, where "$M_P$" represents the mass of a positive electrode active material per cell chamber and "$M_N$" represents the mass of a negative electrode active material per cell chamber. The life characteristic of each battery and the characteristic of each battery in the short-distance drive mode were evaluated.

The negative electrode grid is formed of an expanded grid of Pb-1.2Sn-0.1Ca, and the surface layer is made of Pb-3mass%Sb foil. Moreover, a positive electrode grid is formed of an expanded grid of Pb-1.6Sn-0.1Ca, and no surface layer is formed on the positive electrode grid.

Table 1 shows the evaluation results of each characteristic. Note that a battery A8 in which no surface layer is formed on a surface of a negative electrode grid was formed as a comparative example. In addition, since it is difficult to form, as a negative electrode grid, an expanded grid from a lead alloy containing Sb, such an expanded grid was excluded from consideration.

TABLE 1

| | | NEGATIVE ELECTRODE PLATE | | LIFE | CHARACTERISTIC IN SHORT- |
| --- | --- | --- | --- | --- | --- |
| | MASS RATIO $M_N/M_P$ | NEGATIVE ELECTRODE GRID | SURFACE LAYER | CHARACTERISTIC (THE NUMBER OF TIMES) | DISTANCE DRIVE MODE SOC (%) |
| BATTERY A1 | 0.65 | Pb—Sn—Ca | Pb—Sb | 28,800 | 54 |
| BATTERY A2 | 0.70 | Pb—Sn—Ca | Pb—Sb | 32,400 | 71 |
| BATTERY A3 | 0.80 | Pb—Sn—Ca | Pb—Sb | 39,600 | 74 |
| BATTERY A4 | 0.90 | Pb—Sn—Ca | Pb—Sb | 43,200 | 75 |

TABLE 1-continued

| | MASS RATIO $M_N/M_P$ | NEGATIVE ELECTRODE PLATE | | LIFE CHARACTERISTIC (THE NUMBER OF TIMES) | CHARACTERISTIC IN SHORT-DISTANCE DRIVE MODE SOC (%) |
|---|---|---|---|---|---|
| | | NEGATIVE ELECTRODE GRID | SURFACE LAYER | | |
| BATTERY A5 | 1.00 | Pb—Sn—Ca | Pb—Sb | 39,600 | 74 |
| BATTERY A6 | 1.10 | Pb—Sn—Ca | Pb—Sb | 28,800 | 73 |
| BATTERY A7 | 1.15 | Pb—Sn—Ca | Pb—Sb | 18,000 | 72 |
| BATTERY A8 | 0.80 | Pb—Sn—Ca | NOT FORMED | 28,800 | 45 |

As will be seen from Table 1, the batteries A2 to A6 whose mass ratio $M_N/M_P$ falls within a range of 0.70 to 1.10 show that the life characteristic is equal to or greater than 28,800 and that the SOC indicating the characteristic in the short-distance drive mode is equal to or higher than 71%. In the lead-acid batteries showing such values, even if the idling stop vehicle is used in the short-distance drive mode, a sufficient life characteristic can be maintained, and activation of the fail-safe mechanism can be reduced. In particular, the batteries A3 to A5 whose mass ratio $M_N/M_P$ falls within a range of 0.80 to 1.00 exhibit excellent characteristics because the life characteristic is equal to or greater than 39,600 and the SOC indicating the characteristic in the short-distance drive mode is equal to or higher than 74%. These batteries have a preferable performance when the idling stop vehicle is used in the short-distance drive mode.

On the other hand, the battery A1 whose mass ratio $M_N/M_P$ is 0.65 shows that the life characteristic is 28,800, but shows that the SOC indicating the characteristic in the short-distance drive mode is a low value of 54%. This may be because the amount of the negative electrode active material is insufficient as compared to the amount of the positive electrode active material, and therefore, the charge acceptance is lowered.

Moreover, the battery A7 whose mass ratio $M_N/M_P$ is 1.15 shows that the SOC indicating the characteristic in the short-distance drive mode is 72%, but shows that the life characteristic is a low value of 18,000. This may be because of the following reasons. Since the amount of the positive electrode active material is insufficient as compared to the amount of the negative electrode active material, softening of the positive electrode active material is developed. With repetition of charging/discharging, binding among positive electrode active materials is weakened, and therefore, degradation of the positive electrode plate is developed.

The battery A8 in which no surface layer is formed on the negative electrode grid shows that the life characteristic is 28,800, but shows that the SOC indicating the characteristic in the short-distance drive mode is an extremely-low value of 45%. This may be because of the following reasons. Since lead alloy foil containing Sb is not formed on the surface of the negative electrode grid, a hydrogen overvoltage does not decrease, and therefore, the charge acceptance is low.

Based on the foregoing results, a lead-acid battery which reduces activation of a fail-safe mechanism and which is adaptable to an idling stop vehicle used in a short-distance drive mode can be achieved in such a manner that a surface layer made of a lead alloy containing antimony is formed on a surface of a negative electrode grid containing no antimony and that the mass ratio $M_N/M_P$ of a negative electrode active material to a positive electrode active material is set within a range of 0.70 to 1.10 and more preferably a range of 0.80 to 1.00.

Example 1-2

Next, in order to further improve the charge acceptance, batteries A9 to A15 were formed from the battery A4 formed in Example 1-1 such that the content of Na ions in the electrolyte varies within a range of 0.005 to 0.56 mol/L. The life characteristic of each battery and the characteristic of each battery in the short-distance drive mode were evaluated. The battery A12 is the same as the battery A4 formed in Example 1-1.

The content of Na ions in the electrolyte was adjusted in such a manner that the amount of sodium sulfate to be added to the electrolyte is changed.

Note that, in the present example, the charge recovery when the lead-acid battery is in an over-discharge state was, in evaluation of the characteristic in the short-distance drive mode, additionally evaluated by the following test method.

Such evaluation was made based on the following assumption. When the lead-acid battery recovered after the lead-acid battery enters the over-discharge state is re-used in the short-distance drive mode to repeat charging/discharging, if the charge recovery of the lead-acid battery is poor, the SOC, which is already low, of the lead-acid battery further decreases by discharging, and therefore, the fail-safe mechanism is activated more frequently.

<Charge Recovery after Over-Discharging>

(A) Discharging is performed at a five-hour rate current (a discharge current of 9.8 A) till 10.5 V.

(B) Subsequently, discharging is, with application of a load of 10 W, performed for 14 days under a temperature of 40° C.±2° C., and then, the lead-acid battery in an open circuit state is left uncontrolled for 14 days.

(C) Subsequently, charging is performed with a charge voltage of 15.0 V (a limited current of 25 A) for four hours under a temperature of 25° C.±3° C.

(D) Subsequently, the lead-acid battery is left uncontrolled for equal to or longer than 16 hours in an atmosphere of −15° C.±1° C., and then, discharging is performed at a discharge current of 300 A till 6.0 V.

The duration until the voltage of the lead-acid battery reaches 6.0 V was evaluated as the SOC recovery after over-discharging.

Table 2 shows the results of the foregoing evaluation.

TABLE 2

|  | MASS RATIO $M_N/M_P$ | NEGATIVE ELECTRODE PLATE | | Na ION CONTENT (mol/L) | LIFE CHARACTERISTIC (THE NUMBER OF TIMES) | CHARACTERISTIC IN SHORT-DISTANCE DRIVE MODE SOC (%) | RECOVERY AFTER OVER-DISCHARGING DURATION (MINUTES) |
|---|---|---|---|---|---|---|---|
|  |  | NEGATIVE ELECTRODE GRID | SURFACE LAYER |  |  |  |  |
| BATTERY A9 | 0.90 | Pb—Sn—Ca | Pb—Sb | 0.005 | 28,800 | 73 | 1.5 |
| BATTERY A10 | 0.90 | Pb—Sn—Ca | Pb—Sb | 0.01 | 32,400 | 73 | 2.5 |
| BATTERY A11 | 0.90 | Pb—Sn—Ca | Pb—Sb | 0.03 | 39,600 | 74 | 2.9 |
| BATTERY A12 | 0.90 | Pb—Sn—Ca | Pb—Sb | 0.11 | 43,200 | 75 | 3 |
| BATTERY A13 | 0.90 | Pb—Sn—Ca | Pb—Sb | 0.28 | 39,600 | 74 | 3 |
| BATTERY A14 | 0.90 | Pb—Sn—Ca | Pb—Sb | 0.45 | 32,400 | 70 | 3 |
| BATTERY A15 | 0.90 | Pb—Sn—Ca | Pb—Sb | 0.56 | 28,800 | 66 | 2.9 |

As will be seen from Table 2, the batteries A10 to A14 whose Na ion content in the electrolyte falls within a range of 0.01 to 0.45 mol/L show that the life characteristic is equal to or greater than 32,400, that the SOC indicating the characteristic in the short-distance drive mode is equal to or higher than 70%, and that the duration indicating the recovery after over-discharging is equal to or longer than 2.5 minutes. In the lead-acid batteries showing such values, even if the idling stop vehicle is used in the short-distance drive mode, a sufficient life characteristic can be maintained, and activation of the fail-safe mechanism can be reduced. In particular, the batteries A11 to A13 whose Na ion content in the electrolyte falls within a range of 0.03 to 0.28 mol/L exhibit excellent properties because the life characteristic is equal to or greater than 39,600, the SOC indicating the characteristic in the short-distance drive mode is equal to or higher than 74%, and the duration indicating the recovery after over-discharging is equal to or longer than 2.9 minutes. These batteries have a preferable performance when the idling stop vehicle is used in the short-distance drive mode.

On the other hand, the battery A9 whose Na ion content in the electrolyte shows that the duration indicating the recovery after over-discharging is a low value of 1.5 minutes. This may be because conductivity in over-discharging is lowered due to a small number of Na ions.

The battery A15 whose Na ion content in the electrolyte is 0.56 mol/L shows that the SOC indicating the characteristic in the short-distance drive mode is a low value of 66%. This may be because the charge acceptance is lowered due to a large number of Na ions.

Based on the foregoing results, the recovery after over-discharging can be improved in such a manner that the electrolyte contains sodium ions at a range of 0.01 to 0.45 mol/L and more preferably a range of 0.03 to 0.28 mol/L. Thus, even if the lead-acid battery is applied to the idling stop vehicle used in the short-distance drive mode, activation of the fail-safe mechanism can be more effectively reduced.

Example 1-3

Next, in order to further the improve charge acceptance, batteries A16 to A22 were formed from the battery A4 formed in Example 1-1 such that the W/L varies within a range of 0.45 to 0.85, where "L" represents the inner dimension of the cell chamber in the stacking direction of the electrode plate groups and "W" represents the total thickness of the positive and negative electrode plates. The life characteristic of each battery and the characteristic of each battery in the short-distance drive mode were evaluated. The battery A19 is the same as the battery A4 formed in Example 1-1.

Figure 3:
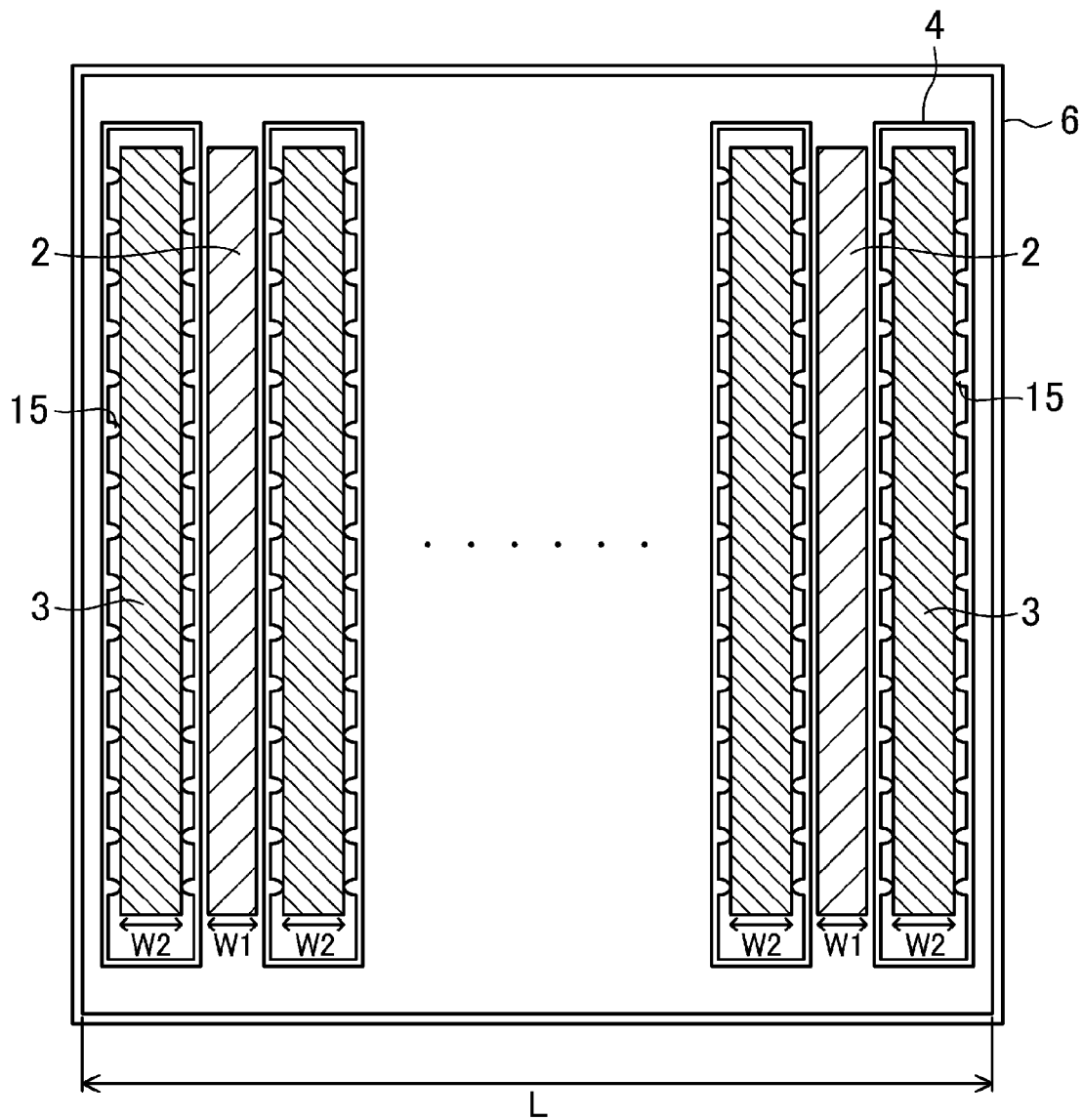
FIG. 3 is a cross-sectional view illustrating a configuration of an electrode plate group housed in a cell chamber.

FIG. 3 is a cross-sectional view of the cell chamber 6. The inner dimension of the cell chamber 6 in the stacking direction of the electrode plate groups housed therein is represented by "L," the thickness of the positive electrode plate 2 is represented by "W1," the thickness of the negative electrode plate 3 is represented by "W2," and the total thickness (W1× 7+W2×8) of the positive electrode plates 2 and the negative electrode plates 3 is represented by "W."

Table 3 shows the evaluation results of each characteristic.

TABLE 3

|  | MASS RATIO $M_N/M_P$ | NEGATIVE ELECTRODE PLATE | | THICKNESS RATIO OF ELECTRODE PLATES TO CELL CHAMBER W/L | LIFE CHARACTERISTIC (THE NUMBER OF TIMES) | CHARACTERISTIC IN SHORT-DISTANCE DRIVE MODE SOC (%) |
|---|---|---|---|---|---|---|
|  |  | NEGATIVE ELECTRODE GRID | SURFACE LAYER |  |  |  |
| BATTERY A16 | 0.90 | Pb—Sn—Ca | Pb—Sb | 0.45 | 28,800 | 64 |

TABLE 3-continued

| | MASS RATIO $M_N/M_P$ | NEGATIVE ELECTRODE PLATE | | THICKNESS RATIO OF ELECTRODE PLATES TO CELL CHAMBER W/L | LIFE CHARACTERISTIC (THE NUMBER OF TIMES) | CHARACTERISTIC IN SHORT-DISTANCE DRIVE MODE SOC (%) |
|---|---|---|---|---|---|---|
| | | NEGATIVE ELECTRODE GRID | SURFACE LAYER | | | |
| BATTERY A17 | 0.90 | Pb—Sn—Ca | Pb—Sb | 0.50 | 39,600 | 71 |
| BATTERY A18 | 0.90 | Pb—Sn—Ca | Pb—Sb | 0.60 | 39,600 | 74 |
| BATTERY A19 | 0.90 | Pb—Sn—Ca | Pb—Sb | 0.65 | 43,200 | 75 |
| BATTERY A20 | 0.90 | Pb—Sn—Ca | Pb—Sb | 0.70 | 39,600 | 74 |
| BATTERY A21 | 0.90 | Pb—Sn—Ca | Pb—Sb | 0.80 | 39,600 | 71 |
| BATTERY A22 | 0.90 | Pb—Sn—Ca | Pb—Sb | 0.85 | 39,600 | 66 |

As will be seen from Table 3, the batteries A17 to A21 whose W/L falls within a range of 0.50 to 0.80 show that the life characteristic is equal to or greater than 39,600 and that the SOC indicating the characteristic in the short-distance drive mode is equal to or higher than 71%. In the lead-acid batteries showing such values, even if the idling stop vehicle is used in the short-distance drive mode, a sufficient life characteristic can be maintained, and activation of the fail-safe mechanism can be reduced. In particular, the batteries A18 to A20 whose W/L falls within a range of 0.60 to 0.70 exhibit excellent properties because the life characteristic is equal to or greater than 39,600 and the SOC indicating the characteristic in the short-distance drive mode is equal to or higher than 74%. These batteries have a preferable performance when the idling stop vehicle is used in the short-distance drive mode.

On the other hand, the battery A16 whose W/L is 0.45 shows that the life characteristic is 28,800, but shows that the SOC indicating the characteristic in the short-distance drive mode is a low value of 64%. This may be because the charge acceptance is lowered due to a lack of active material.

The battery A22 whose W/L is 0.85 shows that the life characteristic is 39,600, but shows that the SOC indicating the characteristic in the short-distance drive mode is a low value of 66%. This may be because the charge acceptance is lowered due to a lack of electrolyte entering the clearance between adjacent ones of the members in the battery A22.

Based on the foregoing results, the charge acceptance can be further improved in such a manner that the W/L is set within a range of 0.50 to 0.80 and more preferably a range of 0.60 to 0.70. Thus, even if the lead-acid battery is applied to the idling stop vehicle used in the short-distance drive mode, activation of the fail-safe mechanism can be more effectively reduced.

Example 1-4

Next, in order to further improve the charge acceptance, a battery A23 was formed from the battery A3 formed in Example 1-1 such that a plurality of ribs 15 for forming a certain clearance between the negative electrode plate 3 and the bag-shaped separator 4 housing the negative electrode plate 3 are formed at the inner part of the separator 4. Note that a battery A24 in which ribs 15 are formed so as to face positive electrode plates 2, a battery A25 in which each positive electrode plate 2 is housed in a corresponding one of bag-shaped separators 4 and ribs 15 are formed so as to face negative electrode plates 3, and a battery A26 in which plate-shaped separators are used instead of bag-shaped separators 4 and ribs 15 are formed so as to face negative electrode plates 3 were formed as comparative examples. The height of the rib 15 was 0.2 mm, and was integrally formed with the separator 4.

Table 4 shows the evaluation results of each characteristic.

TABLE 4

| | MASS RATIO $M_N/M_P$ | NEGATIVE ELECTRODE PLATE | | SEPARATOR | | | LIFE CHARACTERISTIC (THE NUMBER OF TIMES) | CHARACTERISTIC IN SHORT-DISTANCE DRIVE MODE SOC (%) |
|---|---|---|---|---|---|---|---|---|
| | | NEGATIVE ELECTRODE GRID | SURFACE LAYER | SHAPE | MEMBER TO BE HOUSED | RIB | | |
| BATTERY A23 | 0.90 | Pb—Sn—Ca | Pb—Sb | BAG | NEGATIVE ELECTRODE PLATE | NEGATIVE ELECTRODE SIDE | 39,600 | 75 |
| BATTERY A24 | 0.90 | Pb—Sn—Ca | Pb—Sb | BAG | NEGATIVE ELECTRODE PLATE | POSITIVE ELECTRODE SIDE | 39,600 | 66 |
| BATTERY A25 | 0.90 | Pb—Sn—Ca | Pb—Sb | BAG | POSITIVE ELECTRODE PLATE | NEGATIVE ELECTRODE SIDE | 39,600 | 67 |

TABLE 4-continued

| | | NEGATIVE ELECTRODE PLATE | | | | | LIFE CHARACTERISTIC | CHARACTERISTIC IN SHORT- |
|---|---|---|---|---|---|---|---|---|
| | MASS RATIO $M_N/M_P$ | NEGATIVE ELECTRODE GRID | SURFACE LAYER | SEPARATOR | | | (THE NUMBER OF TIMES) | DISTANCE DRIVE MODE SOC (%) |
| | | | | SHAPE | MEMBER TO BE HOUSED | RIB | | |
| BATTERY A26 | 0.90 | Pb—Sn—Ca | Pb—Sb | PLATE | — | NEGATIVE ELECTRODE SIDE | 39,600 | 64 |

As will be seen from Table 4, the battery A23 in which the ribs are formed at the inner part of the separator so as to face the negative electrode plates shows that the life characteristic is 39,600 and that the SOC indicating the characteristic in the short-distance drive mode is 75%. In the lead-acid battery showing such values, even if the idling stop vehicle is used in the short-distance drive mode, a sufficient life characteristic can be maintained, and activation of the fail-safe mechanism can be reduced.

On the other hand, any of the battery A24 in which the ribs are formed so as to face the positive electrode plates, the battery A25 in which each positive electrode plate is housed in a corresponding one of the bag-shaped separators and the ribs are formed so as to face the negative electrode plates, and the battery A26 in which the plate-shaped separator is used and the ribs are formed so as to face the negative electrode plates shows that the SOC indicating the characteristic in the short-distance drive mode is a low value of equal to or lower than 67%. This may be because of the following reasons. When the negative electrode plates arranged respectively on both sides in the electrode plate group are pressed against inner walls of the cell chamber, no clearance is formed between the negative electrode plate and the cell chamber, and the charge acceptance is lowered due to a lack of electrolyte entering the clearance between adjacent ones of the members in the battery.

Based on the foregoing results, the charge acceptance of the lead-acid battery can be further improved in such a manner that each negative electrode plate is housed in the bag-shaped separator and the ribs for forming a certain clearance between the negative electrode plate and the separator are formed at the inner part of the separator. Thus, even if the lead-acid battery is applied to the idling stop vehicle used in the short-distance drive mode, activation of the fail-safe mechanism can be more effectively reduced.

Second Embodiment

FIG. 2 is the schematic view also illustrating an outline configuration of a lead-acid battery 1 of a second embodiment of the present invention.

Referring to FIG. 2, in the lead-acid battery 1, an electrode plate group 5 in which a plurality of positive electrode plates 2 and a plurality of negative electrode plates 3 are stacked on each other with a separator 4 being interposed between adjacent ones of the positive and negative electrode plates 2, 3 is housed in each cell chamber 6 together with an electrolyte.

The positive electrode plate 2 includes a positive electrode grid and a positive electrode active material with which the positive electrode grid is filled, and the negative electrode plate 3 includes a negative electrode grid and a negative electrode active material with which the negative electrode grid is filled. Note that the positive and negative electrode grids of the present embodiment are made of lead or a lead alloy containing no antimony (Sb), such as a Pb—Ca alloy, a Pb—Sn alloy, or a Pb—Sn—Ca alloy. The phrase of "containing no antimony" means that no antimony is added as an alloy component, and the case where a raw material contains a slight amount of antimony as an impurity is considered as no antimony being contained. That is, in the case where antimony is an unavoidable impurity, it deems, in the present invention, that no antimony is contained. Surface layers (not shown) containing antimony are formed on surfaces of the positive and negative electrode grids. Note that the surface layer is preferably made of a Pb—Sb based alloy containing antimony at a content of 1.0 to 5.0 mass %.

The positive electrode plates 2 are, at ear parts 9 of the positive electrode grids, connected together in parallel by a positive electrode strap 7, and the negative electrode plates 3 are, at ear parts 10 of the negative electrode grids, connected together in parallel by a negative electrode strap 8. The electrode plate groups 5 housed respectively in the cell chambers 6 are connected together in series by a connector 11. The positive electrode strap 7 and the negative electrode strap 8 housed respectively in the cell chambers 6 positioned respectively at both ends of the lead-acid battery 1 are welded respectively to poles (not shown), and each pole is welded to a corresponding one of positive and negative electrode terminals 12, 13 arranged on a cover 14.

Figure 4:
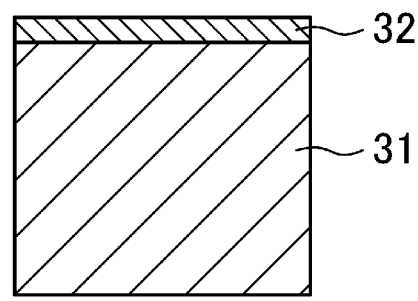
FIG. 4 is a cross-sectional view of a strand of a grid.

The positive and negative electrode surface layers formed on the surfaces of the positive and negative electrode grids and containing antimony are formed of Pb—Sb based alloy foil bonded to surfaces of lead alloy plates to be the grids. The structure of the grid is the same as that of an expanded metal. Thus, when the cross section of a strand 31 of the grid is observed using an EPMA, a part 32 containing Sb is, referring to FIG. 4, observed on one side of the rectangular cross section.

In the present embodiment, the area PS of the positive electrode surface layer is larger than the area NS of the negative electrode surface layer. That is, a value PS obtained by summing the area of a positive electrode surface layer on strands and the area of a positive electrode surface layer on bonds in a single positive electrode grid is greater than a value NS obtained by summing the area of a negative electrode surface layer on strands and the area of a negative electrode surface layer on bonds in a single negative electrode grid. The values PS, NS are each substantially equal to the area of Pb—Sb based alloy foil bonded to the surface of the lead alloy plate to be the grid.

As described in Patent Documents 1 and 2, the merits of forming the antimony-containing layer on the surface of the negative electrode grid are reduction of a decrease in thickness of the ear part of the negative electrode in the idling stop mode and efficient charge recovery of the negative electrode plate, but the demerit of forming the antimony-containing layer on the surface of the negative electrode grid is acceleration of electrolysis of water. For such reasons, it is not preferable that the negative electrode surface layer is formed to have a larger area than is necessary.

Study has been further conducted by the inventors of the present invention, and it has been found that Pb which is a negative electrode active material and lead sulfate which is a discharge product are accumulated on a negative electrode surface layer due to repetition of charging/discharging, and the accumulated Pb and lead sulfate cover the surface layer to lower a charge recovery function of a negative electrode plate. This is a great demerit for idling stop vehicles used in a short-distance drive mode. As a result of various types of study, it has been found that a surface layer containing Sb is formed on a surface of a positive electrode grid to have an area larger than that of the negative electrode surface layer, thereby overcoming, for the purpose of use in the idling stop vehicles, the foregoing demerit without lowering various characteristics in the short-distance drive mode. Moreover, it has been also found that the characteristic in the short-distance drive mode is further improved when NS/PS is equal to or higher than 0.3.

That is, the Sb-containing surface layer formed on the surface of the positive electrode grid can reduce or prevent lowering of the charge recovery function of the negative electrode plate caused as a result of gradual elution of Sb from the positive electrode surface layer with repetition of charging/discharging and movement of the Sb to the negative electrode plate. Even for application in the idling stop vehicles used in the short-distance drive mode, activation of a fail-safe mechanism can be reduced.

With repetition of charging/discharging, the surface area of the negative electrode surface layer decreases, and accordingly, the efficacy of containing Sb in the negative electrode surface layer is reduced. For such reasons, the negative electrode surface layer is preferably formed to have a higher antimony content than that of the positive electrode surface layer. This can improve the charge acceptance of the lead-acid battery 1 for a long period of time. Even if the lead-acid battery 1 is applied to the idling stop vehicle used in the short-distance drive mode, activation of the fail-safe mechanism can be further reduced.

A highly-productive rotary method is preferable in manufacturing positive and negative electrode grids, but a strand(s) may be twisted by such a manufacturing method. Since corrosion occurs starting from such a twisted part(s) of the positive electrode to shorten the battery life, the positive electrode grids are preferably manufactured by a reciprocating method causing no twisting.

In a preferable example of the present embodiment, an electrolyte contains aluminum ions. As described in Patent Document 1, the electrolyte containing aluminum ions can improve the charge acceptance of the lead-acid battery. Even if such a battery is applied to the idling stop vehicle used in the short-distance drive mode, activation of the fail-safe mechanism can be further reduced.

Moreover, in the present embodiment, the mass ratio $M_N/M_P$ is set within a range of 0.70 to 1.10 and preferably a range of 0.80 to 1.00, where "$M_P$" represents the mass of the positive electrode active material per cell chamber 6 and "$M_N$" represents the mass of the negative electrode active material per cell chamber 6. When the mass ratio $M_N/M_P$ of the negative electrode active material to the positive electrode active material falls within the foregoing range, a life characteristic can be maintained, and the charge acceptance of the lead-acid battery 1 can be improved. Thus, even if the lead-acid battery 1 is applied to the idling stop vehicle used in the short-distance drive mode, activation of the fail-safe mechanism can be reduced.

In the present embodiment, the electrolyte contains sodium ions at a range of 0.01 to 0.45 mol/L and more preferably a range of 0.03 to 0.28 mol/L. The sodium ions contained in the electrolyte exhibit the effect of improving charge recovery after over-discharging, thereby further improving the charge acceptance of the lead-acid battery 1. Thus, even if the lead-acid battery 1 is applied to the idling stop vehicle used in the short-distance drive mode, activation of the fail-safe mechanism can be more effectively reduced.

In the present embodiment, W/L preferably falls within a range of 0.50 to 0.80, where "L" represents the inner dimension of the cell chamber 6 in the stacking direction of the electrode plate groups 5 and "W" represents the total thickness of the positive and negative electrode plates 2, 3. The value of W/L shows the size of the clearance between the positive electrode plate 2 and the negative electrode plate 3, i.e., the indicator for amount of the electrolyte entering such a clearance. When the value of W/L falls within a range of 0.50 to 0.80, the charge acceptance of the lead-acid battery 1 is further improved. Thus, even if the lead-acid battery 1 is applied to the idling stop vehicle used in the short-distance drive mode, activation of the fail-safe mechanism can be more effectively reduced.

In the present embodiment, it is preferable that the negative electrode plates 3 are arranged respectively on both sides in the electrode plate group 5 and are each housed in a corresponding one of the bag-shaped separators 4 and that a plurality of ribs for forming a certain clearance between the negative electrode plate 3 and the separator 4 are formed at an inner part of the separator 4. This allows the electrolyte to enter such a clearance in each of the negative electrode plates 3 arranged respectively on both sides in the electrode plate group 5, thereby further improving the charge acceptance of the lead-acid battery 1. Thus, even if the lead-acid battery 1 is applied to the idling stop vehicle used in the short-distance drive mode, activation of the fail-safe mechanism can be more effectively reduced.

The foregoing advantages can be achieved as long as the ribs are formed at least at the separators 4 each housing a corresponding one of the negative electrode plates 3 arranged respectively on both sides in the electrode plate group 5. However, a plurality of ribs may be, needless to say, formed at the separators 4 each housing a corresponding one of all of the negative electrode plates 3. If the lead-acid battery 1 includes only a single cell chamber 6, a container of the lead-acid battery 1 may also serve as the cell chamber 6.

Second Example

The configuration and advantages of the present invention will be further described below with reference to examples of the present embodiment. Note that the present invention is not limited to these examples.

(1) Formation of Lead-Acid Battery

Lead-acid batteries 1 formed in the present examples are liquid lead-acid batteries having a D23L size specified in JIS D 5301. Seven positive electrode plates 2 and eight negative electrode plates 3 are housed in each cell chamber 6, and each negative electrode plate 3 is housed in a bag-shaped separator 4 made of polyethylene.

Table 5 shows the configurations and characteristics of batteries B1 to B9 of the present examples and comparative batteries A, B of comparative examples.

TABLE 5

| | POSITIVE ELECTRODE PLATE | NEGATIVE ELECTRODE PLATE | BONDING OF Sb FOIL | | | SHORT-DISTANCE DRIVE MODE (%) |
| | | | AREA RATIO (NEGATIVE ELECTRODE/ POSITIVE ELECTRODE NS/PS | ELECTRODE PLATE HAVING HIGHER Sb CONCENTRATION IN FOIL | Al CONTAINED IN ELECTROLYTE (MASS %) | |
|---|---|---|---|---|---|---|
| BATTERY B1 | FORMED | FORMED | 0.20 | NEGATIVE ELECTRODE | NOT CONTAINED | 66 |
| BATTERY B2 | FORMED | FORMED | 0.30 | NEGATIVE ELECTRODE | NOT CONTAINED | 70 |
| BATTERY B3 | FORMED | FORMED | 0.40 | NEGATIVE ELECTRODE | NOT CONTAINED | 75 |
| BATTERY B4 | FORMED | FORMED | 0.50 | NEGATIVE ELECTRODE | NOT CONTAINED | 75 |
| BATTERY B5 | FORMED | FORMED | 0.60 | NEGATIVE ELECTRODE | NOT CONTAINED | 75 |
| BATTERY B6 | FORMED | FORMED | 0.80 | NEGATIVE ELECTRODE | NOT CONTAINED | 70 |
| BATTERY B7 | FORMED | FORMED | 0.90 | NEGATIVE ELECTRODE | NOT CONTAINED | 66 |
| BATTERY A | FORMED | FORMED | 1.00 | NEGATIVE ELECTRODE | NOT CONTAINED | 45 |
| BATTERY B | FORMED | NOT FORMED | — | — | NOT CONTAINED | 40 |
| BATTERY B8 | FORMED | FORMED | 0.50 | POSITIVE ELECTRODE | NOT CONTAINED | 70 |
| BATTERY B9 | FORMED | FORMED | 0.50 | NEGATIVE ELECTRODE | 0.1 | 80 |

The common configuration other than the configuration shown in Table 5 will be described below.

Each positive electrode plate 2 was formed in such a manner that lead oxide powder is mixed with sulfuric acid and purified water to prepare a paste and an expanded grid made of a material having the composition of a calcium-based lead alloy is filled with the paste.

Each negative electrode plate 3 was formed in such a manner that an organic additive etc. are added to lead oxide powder, the resultant is mixed with sulfuric acid and purified water to prepare a paste, and an expanded grid made of a material having the composition of a calcium-based lead alloy is filled with the paste.

A negative electrode grid is formed of an expanded grid of Pb-1.2Sn-0.1Ca and formed by a rotary method, and a surface layer is made of Pb-3mass%Sb foil (Pb-2mass%Sb foil only in an eighth example). Moreover, a positive electrode grid is formed of an expanded grid of Pb-1.6Sn-0.1Ca and formed by a reciprocating method, and a surface layer is formed of Pb-2mass%Sb foil (Pb-3mass%Sb foil only in the battery B8).

After the formed positive electrode plates 2 and the formed negative electrode plates 3 were matured and dried, the negative electrode plates 3 were housed respectively in the bag-shaped separators 4 made of polyethylene, and then, the negative electrode plates 3 and the positive electrode plates 2 were alternately stacked on each other. As a result, an electrode plate group 5 in which the seven positive electrode plates 2 and the eight negative electrode plates 3 are stacked on each other with the separator 4 being interposed between adjacent ones of the positive and negative electrode plates 2, 3 was formed. The electrode plate group 5 was housed in each of the six cell chambers 6, and a lead-acid battery 1 in which six cells are connected together in series was formed.

An electrolyte containing diluted sulfuric acid at a density of 1.28 g/cm$^3$ was introduced into the lead-acid battery 1, and then, chemical conversion was performed in a container. As a result, a 12V 48 Ah lead-acid battery 1 was formed.

(2) Evaluation on Characteristics of Lead-Acid Battery: Evaluation on Characteristic in Short-Distance Drive Mode For the formed lead-acid battery 1, charging/discharging intended for the short-distance drive mode were repeated to evaluate the characteristic of the lead-acid battery in the short-distance drive mode. Note that an environmental temperature was 25° C.±2° C.

(A) After discharging is performed at 9.6 A for 2.5 hours, and then, the lead-acid battery is left uncontrolled for 24 hours.

(B) Subsequently, discharging is performed at a discharge current of 20 A for 40 seconds.

(C) Next, charging is performed with a charge voltage of 14.2 V (a limited current of 50 A) for 60 seconds.

(D) After the discharging (B) and the charging (C) are repeated 18 times, discharging is performed at a discharge current of 20 mA for 83.5 hours.

(E) Cycles are repeated 20 times, the discharging (B), the charging (C), and the discharging (D) being counted as a single cycle.

The SOC of the lead-acid battery after 20 cycles was measured, and such a value was taken as the characteristic in the short-distance drive mode.

(Area Ratio of Negative Electrode Surface Layer to Positive Electrode Surface Layer)

The battery characteristics were compared among the batteries B1 to B7 and the comparative battery A under the conditions where the batteries B1 to B7 and the comparative battery A are the same as each other except that the area ratio NS/PS of the negative electrode surface layer to the positive electrode surface layer varies as a parameter.

As will be seen from Table 5, the batteries B2 to B6 whose NS/PS falls within a range of 0.3 to 0.8 show that the SOC indicating the characteristic in the short-distance drive mode is equal to or higher than 70%. In the lead-acid batteries showing such values, even if the idling stop vehicle is used in the short-distance drive mode, a sufficient life characteristic can be maintained, and activation of the fail-safe mechanism can be reduced. In particular, the batteries B3 to B5 whose area ratio NS/PS falls within a range of 0.4 to 0.6 exhibit excellent characteristics because the SOC indicating the characteristic in the short-distance drive mode is equal to or higher than 75%. These batteries have a preferable performance when the idling stop vehicle is used in the short-distance drive mode.

On the other hand, the battery B1 whose NS/PS is 0.2 shows that the SOC indicating the characteristic in the short-distance drive mode is a low value of 66%. This may be because the amount of Sb contained on the negative electrode side is insufficient as compared to the amount of Sb contained on the positive electrode side, and therefore, the charge acceptance is lowered. However, such a state is within the range of causing no problem in practical use.

The battery B7 whose NS/PS is 0.9 shows that the SOC indicating the characteristic in the short-distance drive mode is a low value of 66%. This may be because the amount of Sb contained on the negative electrode side is more than the amount of Sb contained on the positive electrode side, and therefore, electrolysis of water is accelerated and the charge efficiency of the negative electrode plate is lowered. However, such a state is within the range of causing no problem in practical use.

On the other hand, the comparative battery A whose NS/PS is 1 shows that the SOC indicating the characteristic in the short-distance drive mode is an extremely-low value of 45%, and therefore, this allows activation of the fail-safe mechanism. As in the battery B7, this may be because the amount of Sb contained on the negative electrode side is more than the amount of Sb contained on the positive electrode side, and therefore, electrolysis of water is accelerated and the charge efficiency of the negative electrode plate is lowered.

(Absence/Presence of Negative Electrode Surface Layer)

The comparative battery B including the positive electrode surface layer but including no surface layer on the negative electrode grid shows that the SOC indicating the characteristic in the short-distance drive mode is an extremely-low value of 40%, and therefore, this allows activation of the fail-safe mechanism. This may be because no lead alloy foil containing Sb is formed on the surface of the negative electrode grid, and therefore, a hydrogen overvoltage does not decrease and the charge acceptance is low.

Based on the foregoing results, a lead-acid battery which reduces activation of a fail-safe mechanism and which is adaptable to an idling stop vehicle used in a short-distance drive mode can be achieved in such a manner that positive and negative electrode surface layers made of a lead alloy containing antimony are formed respectively on surfaces of positive and negative electrode grids containing no antimony and that the area of the positive electrode surface layer is set larger than that of the negative electrode surface layer. Moreover, the characteristic in the short-distance drive mode is further improved in such a manner that the area ratio NS/PS of the negative electrode surface layer to the positive electrode surface layer is set within a range of 0.30 to 0.90 and more preferably a range of 0.40 to 0.60.

(Difference in Sb Content Between Positive and Negative Electrode Surface Layers)

The battery B8 was formed from the battery B4 such that the negative electrode surface layer is formed of Pb-2mass%Sb foil and that the positive electrode surface layer is formed of Pb-3mass%Sb foil. The battery B8 is inferior to the battery B4 because the SOC indicating the characteristic in the short-distance drive mode is 70%. However, the battery B8 has a preferable performance when the idling stop vehicle is used in the short-distance drive mode.

(Addition of Aluminum Ions)

Next, in order to further improve the charge acceptance, the battery B9 was formed from the battery B4 in such a manner that aluminum ions of 0.1 mass % are added to the electrolyte of the battery B4, and the characteristic of the battery B9 in the short-distance drive mode was evaluated.

As will be seen from Table 5, the SOC indicating the characteristic in the short-distance drive mode is an extremely-high value of 80%, and the battery B9 has a much preferable performance when the idling stop vehicle is used in the short-distance drive mode.

Third Embodiment

FIG. 2 is the schematic view also illustrating an outline configuration of a lead-acid battery 1 of a third embodiment of the present invention.

Referring to FIG. 2, in the lead-acid battery 1, an electrode plate group 5 in which a plurality of positive electrode plates 2 and a plurality of negative electrode plates 3 are stacked on each other with a separator 4 being interposed between adjacent ones of the positive and negative electrode plates 2, 3 is housed in each cell chamber 6 together with an electrolyte.

The positive electrode plate 2 includes a positive electrode grid (not shown) and a positive electrode active material (not shown) with which the positive electrode grid is filled, and the negative electrode plate 3 includes a negative electrode grid 3a and a negative electrode active material (not shown) with which the negative electrode grid 3a is filled. Note that the positive electrode grid and the negative electrode grid 3a of the present embodiment are made of lead or a lead alloy containing no antimony (Sb), such as a Pb—Ca alloy, a Pb—Sn alloy, or a Pb—Sn—Ca alloy. The phrase of "containing no antimony" means that no antimony is added as an alloy component, and the case where a raw material contains a slight amount of antimony as an impurity is considered as no antimony being contained. That is, in the case where antimony is an unavoidable impurity, it deems, in the present invention, that no antimony is contained.

The positive electrode plates 2 are, at ear parts 9 of the positive electrode grids, connected together in parallel by a positive electrode strap 7, and the negative electrode plates 3 are, at ear parts 10 of the negative electrode grids 3a, connected together in parallel by a negative electrode strap 8. The electrode plate groups 5 housed respectively in the cell chambers 6 are connected together in series by a connector 11. The positive electrode strap 7 and the negative electrode strap 8 housed respectively in the cell chambers 6 positioned respectively at both ends of the lead-acid battery 1 are welded respectively to poles, and each pole is welded to a corresponding one of positive and negative electrode terminals 12, 13 arranged on a cover 14.

In the present embodiment, the density of the positive electrode active material in the positive electrode plate 2 is equal to or higher than 3.6 g/ml and equal to or lower than 4.8 g/ml. Moreover, the total pore volume of the positive electrode active material is equal to or greater than 0.06 ml/g and equal to or less than 0.18 ml/g. The negative electrode plates 3 are arranged respectively on both sides in the electrode plate group 5, and each negative electrode plate 3 is housed in a corresponding one of the bag-shaped separators 4.

If the density of the positive electrode active material is lower than 3.6 g/ml or the total pore volume of the positive electrode active material is greater than 0.18 ml/g, the total capacity of the lead-acid battery decreases, and therefore, the battery life in the short-distance drive mode for the purpose of use in idling stop is shortened. Conversely, if the density of the positive electrode active material is higher than 4.8 g/ml or the total pore volume of the positive electrode active material is less than 0.06 ml/g, a decrease in SOC in the short-distance drive mode for the purpose of use in idling stop occurs at an early stage, and therefore, the fail-safe mechanism is frequently activated at an early stage.

Even when the density of the positive electrode active material falls within a range of 3.6 to 4.8 g/ml or the total pore volume of the positive electrode active material falls within a range of 0.06 to 0.18 ml/g, if each negative electrode plate 3 is not housed in a corresponding one of the bag-shaped separators 4, a decrease in SOC in the short-distance drive mode occurs at an early stage as in the foregoing. Since the inventors of the present invention have first found that the fail-safe mechanism is frequently activated at the early stage due to occurrence of the decrease in SOC at the early stage, the detailed description thereof will be made below.

Patent Document 4 discloses that, in order to overcome a short life caused by an increase in frequency of discharging due to the use conditions where the frequency of temporary stop accompanied by idling stop is high, the density of a positive electrode active material is 3.5 to 4.5 g/cc, the specific gravity of an electrolyte is 1.240 to 1.260 (20° C.), and the amount of carbon which is an additive of a negative electrode plate is 0.5 to 2.0% per mass of a negative electrode active material.

Patent Document 4 describes that the short life due to repetition of heavy discharging is improved under the foregoing conditions, and discloses, according to examples of Patent Document 4, that the life is improved in the test of repeating charging and heavy discharging when the foregoing three conditions are satisfied. However, no study has been conducted on a low frequency of use of idling stop vehicles in a short-distance drive mode. Moreover, Patent Document 4 fails to disclose the positions of positive and negative electrode plates and the shape and position of a separator.

The inventors of the present invention have conducted various types of study on the fact that activation of a fail-safe mechanism frequently occurs at an early stage due to a new problem which has never occurred in the case of a low frequency of use of an idling stop vehicle on which a lead-acid battery is mounted in a short-distance drive mode, i.e., due to early occurrence of an SOC decrease which has never occurred in, e.g., Patent Document 4. As a result, the following cause has been found. The idling stop vehicle is not used on weekdays, but is used only for a short-distance drive on weekends. Thus, on weekdays, the SOC gradually decreases due to dark current. Moreover, on weekends, a charge amount becomes insufficient as compared to a discharge amount due to the use of the idling stop vehicle in dense traffic.

In response to the foregoing, the inventors of the present invention have found that the foregoing problem is overcome in such a manner that the density or total pore volume of the positive electrode active material is set as described above and that each negative electrode plate is housed in a corresponding one of the bag-shaped separators.

When each negative electrode plate 3 is housed in a corresponding one of the bag-shaped separators 4, the separator 4 is present at the boundary between the cell chamber and each of the negative electrode plates 3 arranged respectively on both sides in the electrode plate group 5. Thus, the electrolyte can enter the clearance between the separator 4 and the negative electrode plate 3 on the side on which the separator 4 and the cell chamber contact each other. Consequently, the charge acceptance of the lead-acid battery 1 is further improved. Even if the lead-acid battery 1 is applied to the idling stop vehicle used in the short-distance drive mode, activation of the fail-safe mechanism can be more effectively reduced.

In the present embodiment, a surface layer (not shown) made of a lead alloy containing antimony is formed on a surface of the negative electrode grid 3a. The lead alloy containing antimony exhibits the effect of decreasing a hydrogen overvoltage, thereby improving the charge acceptance of the lead-acid battery 1. Note that the surface layer is preferably made of a Pb—Sb based alloy containing antimony at a content of 1.0 to 5.0 mass %.

In the present embodiment, the electrolyte contains sodium ions at a range of 0.01 to 0.45 mol/L and more preferably a range of 0.03 to 0.28 mol/L. The sodium ions contained in the electrolyte exhibit the effect of improving the charge recovery after over-discharging, thereby further improving the charge acceptance of the lead-acid battery 1. Thus, even if the lead-acid battery 1 is applied to the idling stop vehicle used in the short-distance drive mode, activation of the fail-safe mechanism can be more effectively reduced.

In the present embodiment, W/L preferably falls within a range of 0.50 to 0.80, where "L" represents the inner dimension of the cell chamber 6 in the stacking direction of the electrode plate groups 5 and "W" represents the total thickness of the positive and negative electrode plates 2, 3. The value of W/L shows the size of the clearance between the positive electrode plate 2 and the negative electrode plate 3, i.e., the indicator for amount of the electrolyte entering such a clearance. When the value of W/L falls within a range of 0.50 to 0.80, the charge acceptance of the lead-acid battery 1 is further improved. Thus, even if the lead-acid battery 1 is applied to the idling stop vehicle used in the short-distance drive mode, activation of the fail-safe mechanism can be more effectively reduced.

In the present embodiment, it is preferable that a plurality of ribs for forming a certain clearance between the negative electrode plate 3 and the separator 4 are formed at an inner part of the separator 4. This allows the electrolyte to enter such a clearance in each of the negative electrode plates 3 arranged respectively on both sides in the electrode plate group 5, thereby further improving the charge acceptance of the lead-acid battery 1. Thus, even if the lead-acid battery 1 is applied to the idling stop vehicle used in the short-distance drive mode, activation of the fail-safe mechanism can be more effectively reduced.

The foregoing advantages can be achieved as long as the ribs are formed at least at the separators 4 each housing a corresponding one of the negative electrode plates 3 arranged respectively on both sides in the electrode plate group 5. However, a plurality of ribs may be, needless to say, formed at the separators 4 each housing a corresponding one of all of the negative electrode plates 3. If the lead-acid battery 1 includes only a single cell chamber 6, a container of the lead-acid battery 1 may also serve as the cell chamber 6.

Moreover, in the present embodiment, it is preferable that a mass ratio $M_N/M_P$ is set within a range of 0.70 to 1.10 and preferably a range of 0.80 to 1.0, where "$M_P$" represents the mass of the positive electrode active material per cell chamber 6 and "$M_N$" represents the mass of the negative electrode active material per cell chamber 6. When the mass ratio $M_N/M_P$ of the negative electrode active material to the positive electrode active material falls within the foregoing range, a life characteristic can be maintained, and the charge acceptance of the lead-acid battery 1 can be improved. Thus, even if the lead-acid battery 1 is applied to the idling stop vehicle used in the short-distance drive mode, activation of the fail-safe mechanism can be further reduced.

Third Example

The configuration and advantages of the present invention will be further described below with reference to examples of the present embodiment. Note that the present invention is not limited to these examples.

(1) Formation of Lead-Acid Battery Lead-acid batteries 1 formed in the present examples are liquid lead-acid batteries having a D23L size specified in JIS D 5301. Seven positive electrode plates 2 and eight negative electrode plates 3 are housed in each cell chamber 6, and a separator 4 is interposed between the positive electrode plate 2 and the negative electrode plate 3.

Tables 6-1, 6-2, 6-3 shows the configurations and characteristics of batteries C1 to C18 of the examples and comparative batteries A to D of comparative examples.

TABLE 6-1

| | POSITIVE ELECTRODE ACTIVE MATERIAL DENSITY (g/ml) | TOTAL PORE VOLUME OF POSITIVE ELECTRODE (ml/g) | SEPARATOR SHAPE | SEPARATOR MEMBER TO BE HOUSED | SEPARATOR RIB | Na CONTAINED IN ELECTROLYTE (mol/L) | THICKNESS RATIO (W/L) | LIFE (THE NUMBER OF TIMES) | SHORT-DISTANCE DRIVE MODE (%) | RECOVERY AFTER OVER-DISCHARGING (MINUTES) |
|---|---|---|---|---|---|---|---|---|---|---|
| BATTERY A | 3.5 | 0.19 | BAG | NEGATIVE ELECTRODE PLATE | NEGATIVE ELECTRODE SIDE | 0.11 | 0.65 | 18000 | 75 | 3.5 |
| BATTERY C1 | 3.6 | 0.18 | BAG | NEGATIVE ELECTRODE PLATE | NEGATIVE ELECTRODE SIDE | 0.11 | 0.65 | 28800 | 76 | 3.5 |
| BATTERY C2 | 3.9 | 0.15 | BAG | NEGATIVE ELECTRODE PLATE | NEGATIVE ELECTRODE SIDE | 0.11 | 0.65 | 39600 | 76 | 3.5 |
| BATTERY C3 | 4.2 | 0.12 | BAG | NEGATIVE ELECTRODE PLATE | NEGATIVE ELECTRODE SIDE | 0.11 | 0.65 | 46800 | 78 | 3.5 |
| BATTERY C4 | 4.5 | 0.09 | BAG | NEGATIVE ELECTRODE PLATE | NEGATIVE ELECTRODE SIDE | 0.11 | 0.65 | 50400 | 72 | 3.5 |
| BATTERY C5 | 4.8 | 0.06 | BAG | NEGATIVE ELECTRODE PLATE | NEGATIVE ELECTRODE SIDE | 0.11 | 0.65 | 54000 | 67 | 3.5 |
| BATTERY B | 5 | 0.04 | BAG | NEGATIVE ELECTRODE PLATE | NEGATIVE ELECTRODE SIDE | 0.11 | 0.65 | 57600 | 45 | 3.5 |
| BATTERY C | 4.2 | 0.12 | PLATE | — | NEGATIVE ELECTRODE SIDE | 0.11 | 0.65 | 39600 | 50 | 3.5 |
| BATTERY D | 4.2 | 0.12 | BAG | POSITIVE ELECTRODE PLATE | NEGATIVE ELECTRODE SIDE | 0.11 | 0.65 | 39600 | 51 | 3.5 |

TABLE 6-2

| | POSITIVE ELECTRODE ACTIVE MATERIAL DENSITY (g/ml) | TOTAL PORE VOLUME OF POSITIVE ELECTRODE (ml/g) | SEPARATOR SHAPE | SEPARATOR MEMBER TO BE HOUSED | SEPARATOR RIB | Na CONTAINED IN ELECTROLYTE (mol/L) | THICKNESS RATIO (W/L) | LIFE (THE NUMBER OF TIMES) | SHORT-DISTANCE DRIVE MODE (%) | RECOVERY AFTER OVER-DISCHARGING (MINUTES) |
|---|---|---|---|---|---|---|---|---|---|---|
| BATTERY C6 | 4.2 | 0.12 | BAG | NEGATIVE ELECTRODE PLATE | NEGATIVE ELECTRODE SIDE | 0.005 | 0.65 | 54000 | 78 | 1.5 |
| BATTERY C7 | 4.2 | 0.12 | BAG | NEGATIVE ELECTRODE PLATE | NEGATIVE ELECTRODE SIDE | 0.01 | 0.65 | 50400 | 76 | 3.1 |
| BATTERY C8 | 4.2 | 0.12 | BAG | NEGATIVE ELECTRODE PLATE | NEGATIVE ELECTRODE SIDE | 0.03 | 0.65 | 46800 | 83 | 3.4 |
| BATTERY C9 | 4.2 | 0.12 | BAG | NEGATIVE ELECTRODE PLATE | NEGATIVE ELECTRODE SIDE | 0.28 | 0.65 | 46800 | 75 | 3.5 |
| BATTERY C10 | 4.2 | 0.12 | BAG | NEGATIVE ELECTRODE PLATE | NEGATIVE ELECTRODE SIDE | 0.45 | 0.65 | 43200 | 71 | 3.5 |
| BATTERY C11 | 4.2 | 0.12 | BAG | NEGATIVE ELECTRODE PLATE | NEGATIVE ELECTRODE SIDE | 0.56 | 0.65 | 39600 | 65 | 3.5 |

TABLE 6-3

| | POSITIVE ELECTRODE ACTIVE MATERIAL DENSITY (g/ml) | TOTAL PORE VOLUME OF POSITIVE ELECTRODE (ml/g) | SEPARATOR SHAPE | SEPARATOR MEMBER TO BE HOUSED | SEPARATOR RIB | Na CONTAINED IN ELECTROLYTE (mol/L) | THICKNESS RATIO (W/L) | LIFE (THE NUMBER OF TIMES) | SHORT-DISTANCE DRIVE MODE (%) | RECOVERY AFTER OVER-DISCHARGING (MINUTES) |
|---|---|---|---|---|---|---|---|---|---|---|
| BATTERY C12 | 4.2 | 0.12 | BAG | NEGATIVE ELECTRODE PLATE | NEGATIVE ELECTRODE SIDE | 0.11 | 0.45 | 396000 | 69 | 3.5 |
| BATTERY C13 | 4.2 | 0.12 | BAG | NEGATIVE ELECTRODE PLATE | NEGATIVE ELECTRODE SIDE | 0.11 | 0.50 | 39600 | 73 | 3.5 |
| BATTERY C14 | 4.2 | 0.12 | BAG | NEGATIVE ELECTRODE PLATE | NEGATIVE ELECTRODE SIDE | 0.11 | 0.60 | 43200 | 78 | 3.5 |
| BATTERY C15 | 4.2 | 0.12 | BAG | NEGATIVE ELECTRODE PLATE | NEGATIVE ELECTRODE SIDE | 0.11 | 0.70 | 43200 | 79 | 3.5 |
| BATTERY C16 | 4.2 | 0.12 | BAG | NEGATIVE ELECTRODE PLATE | NEGATIVE ELECTRODE SIDE | 0.11 | 0.80 | 39600 | 72 | 3.5 |
| BATTERY C17 | 4.2 | 0.12 | BAG | NEGATIVE ELECTRODE PLATE | NEGATIVE ELECTRODE SIDE | 0.11 | 0.85 | 57600 | 69 | 3.5 |
| BATTERY C18 | 4.2 | 0.12 | BAG | NEGATIVE ELECTRODE PLATE | POSITIVE ELECTRODE SIDE | 0.11 | 0.65 | 43200 | 55 | 3.5 |

The common configuration other than the configuration shown in Tables 6-1, 6-2, 6-3 will be described below.

Each positive electrode plate 2 was formed in such a manner that lead oxide powder is mixed with sulfuric acid and purified water to prepare a paste and an expanded grid made of a material having the composition of a material having the composition of a calcium-based lead alloy is filled with the paste.

Each negative electrode plate 3 was formed in such a manner that an organic additive etc. are added to lead oxide powder, the resultant is mixed with sulfuric acid and purified water to prepare a paste, and an expanded grid made of a material having the composition of a calcium-based lead alloy is filled with the paste.

A negative electrode grid is formed of an expanded grid of Pb-1.2Sn-0.1Ca, and a surface layer is made of Pb-3mass%Sb foil. Moreover, a positive electrode grid is formed of an expanded grid of Pb-1.6Sn-0.1Ca, and no surface layer is formed.

After the formed positive electrode plates 2 and the formed negative electrode plates 3 were matured and dried, the negative electrode plates 3 and the positive electrode plates 2 were alternately stacked on each other with the separator 4 being interposed between adjacent ones of the positive and negative electrode plates 2. As a result, an electrode plate group 5 in which the seven positive electrode plates 2 and the eight negative electrode plates 3 are stacked on each other with the separator 4 being interposed between adjacent ones of the positive and negative electrode plates 2, 3 was formed. The electrode plate group 5 was housed in each of the six cell chambers 6, and lead-acid batteries of the examples and the comparative examples in each of which six cells are connected together in series were formed.

An electrolyte containing diluted sulfuric acid at a density of 1.28 g/cm$^3$ was introduced into the lead-acid battery, and then, chemical conversion was performed in a container. As a result, a 12V 48 Ah lead-acid battery was formed.

<Measurement of Density and Total Pore Volume of Positive Electrode Active Material>

For the matured and dried positive electrode plates 2, the density and total pore volume of the positive electrode active material were measured using a mercury intrusion technique (porosimeter).

A volume a of a sample (the active material of the positive electrode plate) in the state in which mercury is intruded under the conditions where holes having a diameter of equal to or greater than 5 μm are filled with the mercury was obtained, and a density b/a (g/ml) was obtained by dividing the mass b of the sample by the volume a.

In obtaining volumes corresponding respectively to various hole diameters of samples (the active material of the positive electrode plate) under various conditions for intruding mercury, the sum c of the volumes of holes having a diameter of equal to or greater than 0.003 μm and equal to or less than 180 μm, and a total pore volume c/b (ml/g) was obtained by dividing the sum c by the mass b of the sample.

(2) Evaluation on Characteristics of Lead-Acid Battery (2-1) Evaluation on Life Characteristic For the formed lead-acid battery, charging/discharging intended for idling stop were repeated to evaluate the life characteristic of the lead-acid battery.

A life characteristic test was conducted under the following conditions substantially according to the storage battery association standard (SBA S 0101). Note that an environmental temperature was 25° C.±2° C.

(A) After discharging is performed at a discharge current of 45 A for 59 seconds, discharging is performed at 300 A for 1 second.

(B) Subsequently, charging is performed with a charge voltage of 14.2 V (a limited current of 100 A) for 60 seconds.

(C) The lead-acid battery is left uncontrolled for 48 hours every 3600 cycles, the discharging (A) and the charging (B) being counted as one cycle, and then, the cycles are resumed.

The foregoing cycles were repeated, and the number of cycles when the discharge voltage reached less than 7.2 V was taken as the life characteristic. Note that, in the foregoing test, water refilling was not performed till 30000 cycles.

(2-2) Evaluation on Characteristic in Short-Distance Drive Mode

For the formed lead-acid battery 1, charging/discharging intended for the short-distance drive mode were repeated to evaluate the characteristic of the lead-acid battery in the short-distance drive mode. Note that an environmental temperature was 25° C.±2° C.

(A) After discharging is performed at 9.6 A for 2.5 hours, and then, the lead-acid battery is left uncontrolled for 24 hours.

(B) Subsequently, discharging is performed at a discharge current of 20 A for 40 seconds.

(C) Subsequently, charging is performed with a charge voltage of 14.2 V (a limited current of 50 A) for 60 seconds.

(D) After the discharging (B) and the charging (C) are repeated 18 times, discharging is performed at a discharge current of 20 mA for 83.5 hours.

(E) Cycles are repeated 20 times, the discharging (B), the charging (C), and the discharging (D) being counted as a single cycle.

The SOC of the lead-acid battery after 20 cycles was measured, and such a value was taken as the characteristic in the short-distance drive mode.

(2-3) Charge Recovery after Over-Discharging (A) Discharging is performed at a five-hour rate current (a discharge current of 9.8 A) till 10.5 V.

(B) Subsequently, discharging is, with application of a load of 10 W, performed for 14 days under a temperature of 40° C.±2° C., and then, the lead-acid battery in an open circuit state is left uncontrolled for 14 days.

(C) Subsequently, charging is performed with a charge voltage of 15.0 V (a limited current of 25 A) for four hours under a temperature of 25° C.±3° C.

(D) Subsequently, the lead-acid battery is left uncontrolled for equal to or longer than 16 hours in an atmosphere of −15° C.±1° C., and then, discharging is performed at 300 A till 6.0 V.

The duration until the voltage of the lead-acid battery reaches 6.0 V was evaluated as the SOC recovery after over-discharging.

Such evaluation on the charge recovery after over-discharging was made on the following assumption. When the lead-acid battery recovered after the lead-acid battery enters the over-discharge state is re-used in the short-distance drive mode to repeat charging/discharging, if the charge recovery of the lead-acid battery is poor, the SOC of the lead-acid battery further decreases by discharging due to lowering of the charge acceptance accompanied by a decrease in reaction surface area, and therefore, the fail-safe mechanism is activated more frequently.

(Density and Total Pore Volume of Positive Electrode Active Material)

The battery characteristics were compared among the batteries C1 to C5 and the comparative batteries A, B under the conditions where the batteries C1 to C5 and the comparative batteries A, B are the same as each other except that the density and total pore volume of the positive electrode active material vary as parameters.

As will be seen from Table 6-1, the batteries C1 to C5 in which the density of the positive electrode active material falls within a range of 3.6 to 4.8 g/ml or the total pore volume of the positive electrode active material falls within a range of 0.06 to 0.18 ml/g show that the life characteristic is equal to or greater than 28,000 and that the SOC indicating the characteristic in the short-distance drive mode is equal to or higher than 70%. In lead-acid the batteries showing such values, even if the idling stop vehicle is used in the short-distance drive mode, a sufficient life characteristic can be maintained, and activation of the fail-safe mechanism can be reduced. In particular, the batteries C2 to C4 in which the density of the positive electrode active material falls within a range of 3.9 to 4.5 g/ml or the total pore volume of the positive electrode active material falls within a range of 0.09 to 0.15 ml/g exhibit excellent characteristics because the life characteristic is equal to or greater than 39,000 and that the SOC indicating the characteristic in the short-distance drive mode is equal to or higher than 75%. These batteries have a preferable performance when the idling stop vehicle is used in the short-distance drive mode.

On the other hand, the comparative battery A in which the density of the positive electrode active material is 3.5 g/ml which is less than 3.6 g/ml or the total pore volume of the positive electrode active material is 0.19 ml/g which exceeds 0.18 ml/g shows that the SOC indicating the characteristic in the short-distance drive mode is 75%, but shows that the life characteristic is a low value of 18,000. This may be because the positive electrode active material is softened by charging/discharging and is dropped from the electrode plate, and therefore, the total battery capacity decreases.

The comparative battery B in which the density of the positive electrode active material is 5 g/ml which exceeds 4.8 g/ml or the total pore volume of the positive electrode active material is 0.04 ml/g which is less than 0.06 ml/g shows that the life characteristic is an excellent value of 57,600, but shows that the SOC indicating the characteristic in the short-distance drive mode is a low value of 45%. This may be because the positive electrode active material is too dense, and therefore, a sufficient electrolyte cannot enter the positive electrode to contribute to charging/discharging.

(Separator Shape)

The following batteries were formed from the battery C3 of the example: a comparative battery C of the comparative example which is different from the battery C3 of the example only in that a separator is not in a bag shape but in a plate shape (i.e., the separator does not surround a negative electrode plate, but is merely interposed between a positive electrode plate and the negative electrode plate); and a comparative battery D of the comparative example in which each negative electrode plate is not housed in a corresponding one of separators, but each positive electrode plate is housed in a corresponding one of the separators. Evaluation was made for these batteries (see Table 6-1).

The comparative battery C shows that the life characteristic is an excellent value of 39,600, but shows that the SOC indicating the characteristic in the short-distance drive mode is a low value of 50%.

As in the comparative battery C, the comparative battery D also shows that the SOC indicating the characteristic in the short-distance drive mode is a low value of 51%.

The characteristic in the short-distance drive mode may be lowered as described above because of the following reasons. Unlike the battery C3, the negative electrode plate closely contacts an inner wall of the cell chamber, and the electrolyte cannot enter the boundary therebetween. Thus, part of the negative electrode active material is not used, resulting in lowering of the charge acceptance.

(Na Concentration in Electrolyte)

Batteries C6 to C11 were formed from the battery C3 of the example such that an Na ion content in an electrolyte varies within a range of 0.005 to 0.56 mol/L. The life characteristic of each battery and the characteristic of each battery in the short-distance drive mode were evaluated.

The content of Na ions in the electrolyte was adjusted in such a manner that the amount of sodium sulfate to be added to the electrolyte is changed.

As will be seen from Table 6-2, the batteries C7 to C10 whose Na ion content in the electrolyte falls within a range of 0.01 to 0.45 mol/L show that the life characteristic is equal to or greater than 43,000, that the SOC indicating the characteristic in the short-distance drive mode is equal to or higher than 70%, and that the duration indicating the recovery after over-discharging is equal to or longer than 3 minutes. In the lead-acid batteries showing such values, even if the idling stop vehicle is used in the short-distance drive mode, a sufficient life characteristic can be maintained, and activation of the fail-safe mechanism can be reduced. In particular, the batteries C3, C8, and C9 whose Na ion content in the electrolyte falls within a range of 0.03 to 0.28 mol/L exhibit excellent characteristics because the life characteristic is equal to or greater than 46,000, the SOC indicating the characteristic in the short-distance drive mode is equal to or higher than 75%, and the duration indicating the recovery after over-discharging is equal to or longer than 3 minutes. These batteries have a preferable performance when the idling stop vehicle is used in the short-distance drive mode.

On the other hand, the battery C6 whose Na ion content in the electrolyte is 0.005 mol/L shows that the duration indicating the recovery after over-discharging is a low value of 1.5 minutes. This may be because conductivity in over-discharging is lowered due to a small number of Na ions.

The battery C11 whose Na ion content in the electrolyte is 0.56 mol/L shows that the SOC indicating the characteristic in the short-distance drive mode is a low value of 65%. This may be because the charge acceptance is lowered due to a large number of Na ions.

Based on the foregoing results, the recovery after over-discharging is improved in such a manner that the electrolyte contains sodium ions at a range of 0.01 to 0.45 mol/L and more preferably a range of 0.03 to 0.28 mol/L. Thus, even if the lead-acid battery is applied to the idling stop vehicle used in the short-distance drive mode, activation of the fail-safe mechanism can be more effectively reduced.

(Ratio of Total Electrode Plate Thickness to Cell Chamber Width)

Batteries C12 to C17 were formed from the battery C3 of the example such that the W/L varies within a range of 0.45 to 0.85, where "L" represents the inner dimension of the cell chamber in the stacking direction of the electrode plate groups and "W" represents the total thickness of the positive and negative electrode plates. The life characteristic of each battery and the characteristic of each battery in the short-distance drive mode were evaluated.

FIG. 3 is the cross-sectional view of the cell chamber 6. The inner dimension of the cell chamber 6 in the stacking direction of the electrode plate groups housed respectively in the cell chamber 6 is represented by "L," the thickness of the positive electrode plate 2 is represented by "W1," the thickness of the negative electrode plate 3 is represented by "W2," and the total thickness (W1×7+W2×8) of the positive electrode plates 2 and the negative electrode plates 3 is represented by "W."

As will be seen from Table 6-3, the batteries C3, C13 to C16 whose W/L falls within a range of 0.50 to 0.80 show that the life characteristic is equal to or greater than 39,000 and that the SOC indicating the characteristic in the short-distance drive mode is equal to or higher than 70%. In the lead-acid batteries showing such values, even if the idling stop vehicle is used in the short-distance drive mode, a sufficient life characteristic can be maintained, and activation of the fail-safe mechanism can be reduced. In particular, the batteries C3, C14, C15 whose W/L falls within a range of 0.60 to 0.70 exhibit excellent characteristics because the life characteristic is equal to or greater than 43,000 and the SOC indicating the characteristic in the short-distance drive mode is equal to or higher than 75%. These batteries have a preferable performance when the idling stop vehicle is used in the short-distance drive mode.

On the other hand, the battery C12 whose W/L is 0.45 shows that the life characteristic is 39,600, but shows that the SOC indicating the characteristic in the short-distance drive mode is a low value of 69%. This may be because the charge acceptance is lowered due to a lack of active material.

The battery C17 whose W/L is 0.85 shows that the life characteristic is 57,600, but shows that the SOC indicating the characteristic in the short-distance drive mode is a low value of 69%. This may be because the charge acceptance is lowered due to a lack of electrolyte entering the clearance between adjacent ones of the members in the battery C17.

Based on the foregoing results, the charge acceptance is further improved in such a manner that the W/L is set within a range of 0.50 to 0.80 and more preferably a range of 0.60 to 0.70. Thus, even if the lead-acid battery is applied to the idling stop vehicle used in the short-distance drive mode, activation of the fail-safe mechanism can be more effectively reduced.

(Ribs Formed at Separator)

Referring to FIG. 3, in order to improve the charge acceptance, the plurality of ribs 15 for forming a certain clearance between the negative electrode plate 3 and the bag-shaped separator 4 housing the negative electrode plate 3 are formed at the inner part of the separator 4 in the battery C3. In order to confirm the effectiveness of the ribs 15, the battery C18 was formed such that ribs 15 are not formed so as to face the negative electrode plates 3 but to face the positive electrode plates 2, and evaluation was made on the battery C18. Note that the height of the rib 15 was 0.2 mm, and was integrally formed with the separator 4.

As will be seen from Table 6-1, the battery C3 in which the ribs are formed so as to face the negative electrode plates shows that the life characteristic is equal to or greater than 46,000 and that the SOC indicating the characteristic in the short-distance drive mode is equal to or higher than 75%. In the lead-acid battery showing such values, even if the idling stop vehicle is used in the short-distance drive mode, a sufficient life characteristic can be maintained, and activation of the fail-safe mechanism can be reduced.

On the other hand, the battery C18 in which the ribs are formed so as to face the positive electrode plates shows that the SOC indicating the characteristic in the short-distance drive mode is a low value of 55%. This may be because of the following reasons. When the negative electrode plates arranged respectively on both sides in the electrode plate group are pressed against the inner walls of the cell chamber, no clearance is formed between the negative electrode plate and the cell chamber, and the charge acceptance is lowered due to a lack of electrolyte entering the clearance between adjacent ones of the members in the battery C18.

Based on the foregoing results, the charge acceptance of the lead-acid battery is further improved in such a manner that each negative electrode plate is housed in a corresponding one of the bag-shaped separators and the ribs for forming a certain clearance between the negative electrode plate and the separator are formed at the inner part of the separator. Thus, even if the lead-acid battery is applied to the idling stop vehicle used in the short-distance drive mode, activation of the fail-safe mechanism can be more effectively reduced.

In the present embodiment, tin sulfate may be added to the positive electrode. The tin sulfate is preferably added to the positive electrode because a discharge capacity is improved.

Fourth Embodiment

FIG. 2 is the schematic view also illustrating an outline configuration of a lead-acid battery 1 of a fourth embodiment of the present invention.

Referring to FIG. 2, in the lead-acid battery 1, an electrode plate group 5 in which a plurality of positive electrode plates 2 and a plurality of negative electrode plates 3 are stacked on each other with a separator 4 being interposed between adjacent ones of the positive and negative electrode plates 2, 3 is housed in each cell chamber 6 together with an electrolyte.

The positive electrode plate 2 includes a positive electrode grid and a positive electrode active material with which the positive electrode grid is filled, and the negative electrode plate 3 includes a negative electrode grid and a negative electrode active material with which the negative electrode grid is filled. Note that the positive and negative electrode grids of the present embodiment are made of lead or a lead alloy containing no antimony (Sb), such as a Pb—Ca alloy, a Pb—Sn alloy, or a Pb—Sn—Ca alloy.

The positive electrode plates 2 are, at ear parts 9 of the positive electrode grids, connected together in parallel by a positive electrode strap (electrode-plate connection plate) 7, and the negative electrode plates 3 are, at ear parts 10 of the negative electrode grids, connected together in parallel by a negative electrode strap (electrode-plate connection plate) 8. The electrode plate groups 5 housed respectively in the cell chambers 6 are connected together in series by a connector 11. The positive electrode strap 7 and the negative electrode strap 8 housed respectively in the cell chambers 6 positioned respectively at both ends of the lead-acid battery 1 are welded respectively to poles, and each pole is welded to a corresponding one of positive and negative electrode terminals 12, 13 arranged on a cover 14.

In the present embodiment, a surface layer (not shown) made of a lead alloy containing antimony is formed on a surface of the negative electrode grid. The lead alloy containing antimony exhibits the effect of decreasing a hydrogen overvoltage, thereby improving the charge acceptance of the lead-acid battery 1. Note that the surface layer is preferably made of a Pb—Sb based alloy containing antimony at a content of 1.0 to 5.0 mass %.

Moreover, in the present embodiment, a mass ratio $M_S/M_P$ is set within a range of 0.50 to 0.74 and preferably a range of 0.57 to 0.70, where "$M_e$" represents the mass of the positive electrode active material per cell chamber 6 and "$M_S$" represents the mass of sulfuric acid contained in the electrolyte. When the mass ratio $M_S/M_P$ of the sulfuric acid to the positive electrode active material falls within the foregoing range, a life characteristic can be maintained, and the charge acceptance of the lead-acid battery 1 can be improved. Thus, even if the lead-acid battery 1 is applied to an idling stop vehicle used in a short-distance drive mode, activation of a fail-safe mechanism can be reduced.

In the present embodiment, W/L preferably falls within a range of 0.50 to 0.80, where "L" represents the inner dimension of the cell chamber 6 in the stacking direction of the electrode plate groups 5 and "W" represents the total thickness of the positive and negative electrode plates 2, 3. The value of W/L shows the size of the clearance between the positive electrode plate 2 and the negative electrode plate 3, i.e., the indicator for amount of the electrolyte entering such a clearance. When the value of W/L falls within a range of 0.50 to 0.80, the charge acceptance of the lead-acid battery 1 is further improved. Thus, even if the lead-acid battery 1 is applied to the idling stop vehicle used in the short-distance drive mode, activation of the fail-safe mechanism can be more effectively reduced.

In the present embodiment, it is preferable that the density of the positive electrode active material is set within a range of 3.6 to 4.8 g/ml and more preferably a range of 3.9 to 4.5 g/ml. Thus, the charge acceptance of the lead-acid battery 1 is further improved. Consequently, even if the lead-acid battery 1 is applied to the idling stop vehicle used in the short-distance drive mode, activation of the fail-safe mechanism can be more effectively reduced.

In the present embodiment, the electrode-plate connection plates (straps) 7, 8 and the connector 11 are preferably made of a lead alloy containing no antimony and containing tin. Since the electrode-plate connection plates (straps) 7, 8 and the connector 11 (hereinafter referred to as a "connection member") do not contain antimony, corrosion of the ear parts 9, 10 due to elution of antimony to the electrolyte is reduced. Thus, the life characteristic of the lead-acid battery 1 is further improved. Even if the lead-acid battery 1 is applied to the idling stop vehicle used in the short-distance drive mode, activation of the fail-safe mechanism can be more effectively reduced.

Fourth Example

The configuration and advantages of the present invention will be further described below with reference to examples of the present embodiment. Note that the present invention is not limited to these examples.

(1) Formation of Lead-Acid Battery

Lead-acid batteries 1 formed in the present examples are liquid lead-acid batteries having a D23L size specified in JIS D 5301. Seven positive electrode plates 2 and eight negative electrode plates 3 are housed in each cell chamber 6, and each negative electrode plate 3 is housed in a corresponding one of bag-shaped separators 4 made of polyethylene.

Each positive electrode plate 2 was formed in such a manner that lead oxide powder is mixed with sulfuric acid and purified water to prepare a paste and an expanded grid made of a material having the composition of a calcium-based lead alloy is filled with the paste.

Each negative electrode plate 3 was formed in such a manner that an organic additive etc. are added to lead oxide powder, the resultant is mixed with sulfuric acid and purified water to prepare a paste, and an expanded grid made of a material having the composition of a calcium-based lead alloy is filled with the paste.

After the formed positive electrode plates 2 and the formed negative electrode plates 3 were matured and dried, the negative electrode plates 3 were housed respectively in the bag-shaped separators 4 made of polyethylene, and then, the negative electrode plates 3 and the positive electrode plates 2 were alternately stacked on each other. As a result, an electrode plate group 5 in which the seven positive electrode plates 2 and the eight negative electrode plates 3 are stacked on each other with the separator 4 being interposed between adjacent ones of the positive and negative electrode plates 2, 3 was formed. The electrode plate group 5 was housed in each of the six cell chambers 6, and a lead-acid battery 1 in which six cells are connected together in series was formed.

An electrolyte containing diluted sulfuric acid at a density of 1.28 g/cm$^3$ was introduced into the lead-acid battery 1, and then, chemical conversion was performed in a container. As a result, a 12V 48 Ah lead-acid battery 1 was formed.

(2) Evaluation on Characteristics of Lead-Acid Battery (2-1) Evaluation on Life Characteristic For the formed lead-acid battery, charging/discharging intended for idling stop were repeated to evaluate the life characteristic of the lead-acid battery.

A life characteristic test was conducted under the following conditions substantially according to the storage battery association standard (SBA S 0101). Note that an environmental temperature was 25° C.±2° C.

(A) After discharging is performed at a discharge current of 45 A for 59 seconds, discharging is performed at 300 A for 1 second.

(B) Subsequently, charging is performed with a charge voltage of 14.2 V (a limited current of 100 A) for 60 seconds.

(C) The lead-acid battery is left uncontrolled for 48 hours every 3600 cycles, the discharging (A) and the charging (B) being counted as one cycle, and then, the cycles were resumed.

The foregoing cycles were repeated, and the number of cycles when the discharge voltage reached less than 7.2 V was taken as the life characteristic. Note that, in the foregoing test, water refilling was not performed till 30000 cycles.

(2-2) Evaluation on Characteristic in Short-Distance Drive Mode

For the formed lead-acid battery 1, charging/discharging intended for the short-distance drive mode were repeated to evaluate the characteristic of the lead-acid battery in the short-distance drive mode. Note that an environmental temperature was 25° C.±2° C.

(A) After discharging is performed at 9.6 A for 2.5 hours, and then, the lead-acid battery is left uncontrolled for 24 hours.

(B) Discharging is performed at a discharge current of 20 A for 40 seconds.

(C) Charging is performed with a charge voltage of 14.2 V (a limited current of 50 A) for 60 seconds.

(D) After the discharging (B) and the charging (C) are repeated 18 times, discharging is performed at a discharge current of 20 mA for 83.5 hours.

(E) Cycles are repeated 20 times, the discharging (B), the charging (C), and the discharging (D) being counted as a single cycle.

The SOC of the lead-acid battery after 20 cycles was measured, and such a value was taken as the characteristic in the short-distance drive mode.

Example 4-1

Batteries D1 to D7 were formed, in each of which a surface layer made of a lead alloy containing antimony is formed on a surface of a negative electrode grid and a mass ratio $M_S/M_P$ falls within a range of 0.45 to 0.98, where "$M_P$" represents the mass of a positive electrode active material per cell chamber and "$M_S$" represents sulfuric acid contained in an electrolyte. The life characteristic of each battery and the characteristic of each battery in the short-distance drive mode were evaluated.

The negative electrode grid is formed of an expanded grid of Pb-1.2Sn-0.1Ca, and the surface layer is made of Pb-3mass%Sb foil. Moreover, a positive electrode grid is formed of an expanded grid of Pb-1.6Sn-0.1Ca, and no surface layer is formed on the positive electrode grid.

In order to adjust the mass ratio $M_S/M_P$, the mass of the positive electrode active material was changed within a range of 1.5 to 2.5 mol, and the mass of sulfuric acid was changed within a range of 2.4 to 3.6 mol.

Table 7 shows the evaluation results of each characteristic. Note that a battery D8 in which no surface layer is formed on a surface of a negative electrode grid was formed as a comparative example.

TABLE 7

| | MASS RATIO OF SULFURIC ACID TO POSITIVE ELECTRODE ACTIVE MATERIAL $M_S/M_P$ | NEGATIVE ELECTRODE PLATE | | CHARACTERISTIC IN SHORT-DISTANCE DRIVE MODE SOC (%) | LIFE CHARACTERISTIC (THE NUMBER OF TIMES) |
|---|---|---|---|---|---|
| | | NEGATIVE ELECTRODE GRID | SURFACE LAYER | | |
| BATTERY D1 | 0.45 | Pb—Sn—Ca | Pb—Sb | 58 | 43,200 |
| BATTERY D2 | 0.50 | Pb—Sn—Ca | Pb—Sb | 71 | 43,200 |
| BATTERY D3 | 0.57 | Pb—Sn—Ca | Pb—Sb | 74 | 43,200 |
| BATTERY D4 | 0.66 | Pb—Sn—Ca | Pb—Sb | 75 | 43,200 |
| BATTERY D5 | 0.70 | Pb—Sn—Ca | Pb—Sb | 74 | 43,200 |
| BATTERY D6 | 0.74 | Pb—Sn—Ca | Pb—Sb | 71 | 36,000 |
| BATTERY D7 | 0.98 | Pb—Sn—Ca | Pb—Sb | 72 | 18,000 |
| BATTERY D8 | 0.66 | Pb—Sn—Ca | NOT FORMED | 49 | 39,600 |

As will be seen from Table 7, the batteries D2 to D6 whose mass ratio $M_S/M_P$ falls within a range of 0.50 to 0.74 show that the life characteristic is equal to or greater than 36,000 and that the SOC indicating the characteristic in the short-distance drive mode is equal to or higher than 71%. In the lead-acid batteries showing such values, even if the idling stop vehicle is used in the short-distance drive mode, a sufficient life characteristic can be maintained, and activation of the fail-safe mechanism can be reduced. In particular, the batteries D3 to D5 whose mass ratio $M_S/M_P$ falls within a range of 0.57 to 0.70 exhibit excellent properties because the life characteristic is equal to or greater than 43,200 and the SOC indicating the characteristic in the short-distance drive mode is equal to or higher than 74%. These batteries have a preferable performance when the idling stop vehicle is used in the short-distance drive mode.

On the other hand, the battery D1 whose mass ratio $M_S/M_P$ is 0.45 shows that the life characteristic is 43,200, but shows that the SOC indicating the characteristic in the short-distance drive mode is a low value of 58%. This may be because of the following reasons. Since the amount of the electrolyte is insufficient as compared to the amount of the positive electrode active material, charge reaction does not sufficiently occur, and therefore, the charge acceptance is lowered.

Moreover, the battery D7 whose mass ratio $M_S/M_P$ is 0.98 shows that the SOC indicating the characteristic in the short-distance drive mode is 72%, but shows that the life characteristic is a low value of 18,000. This may be because of the following reasons. Since the amount of the positive electrode active material is insufficient as compared to the amount of the electrolyte, softening of the positive electrode active material is developed. With repetition of charging/discharging, binding among positive electrode active materials is weakened, and therefore, degradation of the positive electrode plate is developed.

The battery D8 in which no surface layer is formed on the negative electrode grid shows that the life characteristic is 39,600, but shows that the SOC indicating the characteristic in the short-distance drive mode is an extremely-low value of 49%. This may be because of the following reasons. Since lead alloy foil containing Sb is not formed on the surface of the negative electrode grid, a hydrogen overvoltage does not decrease, and therefore, the charge acceptance is low.

Based on the foregoing results, a lead-acid battery which reduces activation of a fail-safe mechanism and which is adaptable to an idling stop vehicle used in a short-distance drive mode can be achieved in such a manner that a surface layer made of a lead alloy containing antimony is formed on a surface of a negative electrode grid containing no antimony and that the mass ratio $M_S/M_P$ of sulfuric acid contained in an electrolyte to a positive electrode active material is set within a range of 0.50 to 0.74 and more preferably a range of 0.57 to 0.70.

Example 4-2

In order to further improve the charge acceptance, batteries D9 to D15 were formed from the battery D4 formed in Example 4-1 such that W/L varies within a range of 0.45 to 0.85, where "L" represents the inner dimension of the cell chamber in the stacking direction of the electrode plate groups and "W" represents the total thickness of the positive and negative electrode plates. The life characteristic of each battery and the characteristic of each battery in the short-distance drive mode were evaluated. The battery D12 is the same as the battery D4 formed in Example 4-1.

FIG. 3 is the cross-sectional view of the cell chamber 6. The inner dimension of the cell chamber 6 in the stacking direction of the electrode plate groups housed respectively in the cell chamber 6 is represented by "L," the thickness of the positive electrode plate 2 is represented by "W1," the thickness of the negative electrode plate 3 is represented by "W2," and the total thickness (W1×7+W2×8) of the positive electrode plates 2 and the negative electrode plates 3 is represented by "W."

Table 8 shows the evaluation results of each characteristic.

TABLE 8

| | MASS RATIO OF SULFURIC ACID TO POSITIVE ELECTRODE ACTIVE MATERIAL $M_S/M_P$ | NEGATIVE ELECTRODE PLATE | | THICKNESS RATIO OF ELECTRODE PLATES TO CELL CHAMBER | CHARACTERISTIC IN SHORT-DISTANCE DRIVE MODE SOC (%) | LIFE CHARACTERISTIC (THE NUMBER OF TIMES) |
|---|---|---|---|---|---|---|
| | | NEGATIVE ELECTRODE GRID | SURFACE LAYER | | | |
| BATTERY D9 | 0.66 | Pb—Sn—Ca | Pb—Sb | 0.45 | 63 | 36,000 |
| BATTERY D10 | 0.66 | Pb—Sn—Ca | Pb—Sb | 0.50 | 71 | 36,000 |
| BATTERY D11 | 0.66 | Pb—Sn—Ca | Pb—Sb | 0.60 | 74 | 39,600 |
| BATTERY D12 | 0.66 | Pb—Sn—Ca | Pb—Sb | 0.65 | 75 | 43,200 |
| BATTERY D13 | 0.66 | Pb—Sn—Ca | Pb—Sb | 0.70 | 74 | 39,600 |
| BATTERY D14 | 0.66 | Pb—Sn—Ca | Pb—Sb | 0.80 | 71 | 36,000 |
| BATTERY D15 | 0.66 | Pb—Sn—Ca | Pb—Sb | 0.85 | 61 | 36,000 |

As will be seen from Table 8, the batteries D10 to D14 whose W/L falls within a range of 0.50 to 0.80 show that the life characteristic is equal to or greater than 36,000 and that the SOC indicating the characteristic in the short-distance drive mode is equal to or higher than 71%. In the lead-acid batteries showing such values, even if the idling stop vehicle is used in the short-distance drive mode, a sufficient life characteristic can be maintained, and activation of the fail-safe mechanism can be reduced. In particular, the batteries D11 to D13 whose W/L falls within a range of 0.60 to 0.70 exhibit excellent characteristics because the life characteristic is equal to or greater than 39,600 and the SOC indicating the characteristic in the short-distance drive mode is equal to or higher than 74%. These batteries have a preferable performance when the idling stop vehicle is used in the short-distance drive mode.

On the other hand, the battery D9 whose W/L is 0.45 shows that the life characteristic is 36,000, but shows that the SOC indicating the characteristic in the short-distance drive mode is a low value of 63%. This may be because the amount of the negative electrode active material is insufficient as compared to the amount of the positive electrode active material, and therefore, the charge acceptance is lowered.

The battery D15 whose W/L is 0.85 shows that the life characteristic is 36,000, but shows that the SOC indicating the characteristic in the short-distance drive mode is a low value of 61%. This may be because the charge acceptance is lowered due to a lack of electrolyte entering the clearance between adjacent ones of the members in the battery D15.

Based on the foregoing results, the charge acceptance can be further improved in such a manner that the W/L is set within a range of 0.50 to 0.80 and more preferably a range of 0.60 to 0.70. Thus, even if the lead-acid battery is applied to the idling stop vehicle used in the short-distance drive mode, activation of the fail-safe mechanism can be more effectively reduced.

Example 4-3

Next, in order to further improve the charge acceptance, batteries D16 to D22 were formed from the battery D4 formed in Example 4-1 such that the density of the positive electrode active material varies within a range of 3.5 to 5.0 g/ml. Note that the battery D19 is the same as the battery D4 formed in Example 4-1. Moreover, the density of the positive electrode active material indicates the density after chemical conversion, and was measured by the following method. In addition, the total pore volume of the positive electrode relative to the density of each positive electrode active material was also measured.

<Measurement of Density of Positive Electrode Active Material>

By a mercury intrusion technique (porosimeter), a volume a of a sample (the active material of the positive electrode plate) in the state in which mercury is intruded under the conditions where holes having a diameter of equal to or greater than 5 μm are filled with the mercury was obtained, and a density (also referred to as a "bulk density") b/a (g/ml) was obtained by dividing the mass b of the sample by the volume a.

<Measurement of Total Pore Volume of Positive Electrode>

In obtaining, by the mercury intrusion technique (porosimeter), volumes corresponding respectively to various hole diameters of samples (the active material of the positive electrode plate) under various conditions for intruding mercury, the sum c of the volumes of holes having a diameter of equal to or greater than 0.003 μm and equal to or less than 180 μm, and a total pore volume c/b (ml/g) was obtained by dividing the sum c of the pore volumes by the mass b of the sample.

Table 9 shows the evaluation results of each characteristic.

TABLE 9

|  | MASS RATIO OF SULFURIC ACID TO POSITIVE ELECTRODE | NEGATIVE ELECTRODE PLATE | | DENSITY OF POSITIVE ELECTRODE | TOTAL PORE VOLUME OF | CHARACTERISTIC IN SHORT- | LIFE CHARACTER- |
|---|---|---|---|---|---|---|---|
|  | ACTIVE MATERIAL $M_S/M_P$ | NEGATIVE ELECTRODE GRID | SURFACE LAYER | ACTIVE MATERIAL (g/ml) | POSITIVE ELECTRODE (ml/g) | DISTANCE DRIVE MODE SOC (%) | ISTIC (THE NUMBER OF TIMES) |
| BATTERY D16 | 0.66 | Pb—Sn—Ca | Pb—Sb | 3.5 | 0.19 | 75 | 28,800 |
| BATTERY D17 | 0.66 | Pb—Sn—Ca | Pb—Sb | 3.6 | 0.18 | 74 | 36,000 |
| BATTERY D18 | 0.66 | Pb—Sn—Ca | Pb—Sb | 3.9 | 0.15 | 75 | 39,600 |
| BATTERY D19 | 0.66 | Pb—Sn—Ca | Pb—Sb | 4.2 | 0.12 | 75 | 43,200 |
| BATTERY D20 | 0.66 | Pb—Sn—Ca | Pb—Sb | 4.5 | 0.09 | 74 | 43,200 |
| BATTERY D21 | 0.66 | Pb—Sn—Ca | Pb—Sb | 4.8 | 0.06 | 71 | 43,200 |
| BATTERY D22 | 0.66 | Pb—Sn—Ca | Pb—Sb | 5.0 | 0.04 | 55 | 43,200 |

As will be seen from Table 9, the batteries D17 to D21 in which the density of the positive electrode active material falls within a range of 3.6 to 4.8 g/ml (the total pore volume of the positive electrode falls within a range of 0.06 to 0.18 ml/g) show that the life characteristic is equal to or greater than 36,000 and that the SOC indicating the characteristic in the short-distance drive mode is equal to or higher than 71%. In the lead-acid batteries showing such values, even if the idling stop vehicle is used in the short-distance drive mode, a sufficient life characteristic can be maintained, and activation of the fail-safe mechanism can be reduced. In particular, the batteries D18 to D20 in which the density of the positive electrode active material falls within a range of 3.9 to 4.5 g/ml (the total pore volume of the positive electrode falls within a range of 0.09 to 0.15 ml/g) exhibit excellent characteristics because the life characteristic is equal to or greater than 39,600 and that the SOC indicating the characteristic in the short-distance drive mode is equal to or higher than 74%. These batteries have a preferable performance when the idling stop vehicle is used in the short-distance drive mode.

On the other hand, the battery D16 in which the density of the positive electrode active material is 3.5 g/ml (the total pore volume of the positive electrode is 0.19 ml/g) shows that the SOC indicating the characteristic in the short-distance drive mode is 75%, but shows that the life characteristic is a low value of 28,800. This may be because binding among positive electrode active materials is weak, and therefore, degradation of the positive electrode plate is developed.

The battery D22 in which the density of the positive electrode active material is 5.0 g/ml (the total pore volume of the positive electrode is 0.04 ml/g) shows that the life characteristic is 43,200, but shows that the SOC indicating the characteristic in the short-distance drive mode is a low value of 55%. This may be because the positive electrode active material is too dense, and therefore, the charge acceptance is lowered due to a lack of electrolyte entering the clearance between adjacent ones of the members in the battery D22.

Based on the foregoing results, the density of the positive electrode active material is set within a range of 3.6 to 4.8 g/ml (the total pore volume of the positive electrode is set within a range of 0.06 to 0.18 ml/g) and more preferably a range of 3.9 to 4.5 g/ml (the total pore volume of the positive electrode is set within a range of 0.09 to 0.15 ml/g). This maintains a sufficient life characteristic, and further improves the charge acceptance. Thus, even if the lead-acid battery is applied to the idling stop vehicle used in the short-distance drive mode, activation of the fail-safe mechanism can be more effectively reduced.

Example 4-4

Next, in order to further improve the life characteristic, a battery D23 was formed from the battery D4 formed in Example 4-1 such that the configurations of the connection members (electrode-plate connection plates (straps)) 7, 8 and the connector 11 are changed. The life characteristic of each of the batteries D4, D23 and the characteristic of each of the batteries D4, D23 in the short-distance drive mode were evaluated.

The connection members of the battery D23 are made of a lead alloy (Pb-2.7Sb) containing antimony, and the connection members of the battery D4 are made of a leading alloy (Pb-2.5Sn) containing no antimony and containing tin.

Table 10 shows the evaluation results of each characteristic.

Referring to FIG. 2, in the lead-acid battery 1, an electrode plate group 5 in which a plurality of positive electrode plates 2 and a plurality of negative electrode plates 3 are stacked on each other with a separator 4 being interposed between adjacent ones of the positive and negative electrode plates 2, 3 is housed in each cell chamber 6 together with an electrolyte.

The positive electrode plate 2 includes a positive electrode grid and a positive electrode active material with which the positive electrode grid is filled, and the negative electrode plate 3 includes a negative electrode grid and a negative electrode active material with which the negative electrode grid is filled. Note that the positive and negative electrode grids of the present embodiment are made of lead or a lead alloy containing no antimony (Sb), such as a Pb—Ca alloy, a Pb—Sn alloy, or a Pb—Sn—Ca alloy.

The positive electrode plates 2 are, at ear parts 9 of the positive electrode grids, connected together in parallel by a positive electrode strap 7, and the negative electrode plates 3 are, at ear parts 10 of the negative electrode grids, connected together in parallel by a negative electrode strap 8. The electrode plate groups 5 housed respectively in the cell chambers 6 are connected together in series by a connector 11. The positive electrode strap 7 and the negative electrode strap 8 housed respectively in the cell chambers 6 positioned respectively at both ends of the lead-acid battery 1 are welded

TABLE 10

| | MASS RATIO OF SULFURIC ACID TO POSITIVE ELECTRODE | NEGATIVE ELECTRODE PLATE | | | CHARACTERISTIC IN SHORT- | LIFE CHARACTER- |
|---|---|---|---|---|---|---|
| | ACTIVE MATERIAL $M_S/M_P$ | NEGATIVE ELECTRODE GRID | SURFACE LAYER | CONNECTION MEMBER | DISTANCE DRIVE MODE SOC (%) | ISTIC (THE NUMBER OF TIMES) |
| BATTERY D4 | 0.66 | Pb—Sn—Ca | Pb—Sb | Pb—Sn | 75 | 43,200 |
| BATTERY D23 | 0.66 | Pb—Sn—Ca | Pb—Sb | Pb—Sb | 74 | 28,800 |

As will be seen from Table 10, the battery D4 including the connection members made of the lead alloy containing no antimony and containing tin shows a higher life characteristic as compared to that of the battery D23 including the connection members made of the lead alloy containing antimony. This may be because the connection members of the battery D4 do not contain antimony, and therefore, corrosion of the ear parts 9, 10 due to elution of antimony to the electrolyte is reduced.

Based on the foregoing results, the life characteristic is further improved in such a manner that the electrode-plate connection plates and the connection members including connectors are made of the lead alloy containing no antimony and containing tin. Thus, even if the lead-acid battery is applied to the idling stop vehicle used in the short-distance drive mode, activation of the fail-safe mechanism can be more effectively reduced.

Note that poles for connecting the electrode-plate connection plates and external terminals together may be provided as the connection members, and may be made of a lead alloy containing no antimony and containing tin.

Fifth Embodiment

FIG. 2 is the schematic view also illustrating an outline configuration of a lead-acid battery 1 of a fifth embodiment of the present invention.

respectively to poles (not shown), and each pole is welded to a corresponding one of positive and negative electrode terminals 12, 13 arranged on a cover 14.

In the present embodiment, a surface layer (not shown) made of a lead alloy containing antimony is formed on a surface of the negative electrode grid. The lead alloy containing antimony exhibits the effect of decreasing a hydrogen overvoltage, thereby improving the charge acceptance of the lead-acid battery 1. Note that the surface layer is preferably made of a Pb—Sb based alloy containing antimony at a content of 1.0 to 5.0 mass %.

In the present embodiment, the negative electrode plates 3 are arranged respectively on both sides in the electrode plate group 5, and are each housed in a corresponding one of the bag-shaped separators 4. This allows the electrolyte to enter the clearance between the negative electrode plate 3 and the separator 4 in each of the negative electrode plates 3 arranged respectively on both sides in the electrode plate group 5, thereby further improving the charge acceptance of the lead-acid battery 1. Thus, even if the lead-acid battery 1 is applied to an idling stop vehicle used in a short-distance drive mode, activation of a fail-safe mechanism can be more effectively reduced.

In the present embodiment, the electrolyte contains sodium ions at a range of 0.01 to 0.45 mol/L and more preferably a range of 0.03 to 0.28 mol/L. The sodium ions contained in the electrolyte exhibit the effect of improving charge recovery after over-discharging. Thus, even if the lead-acid battery recovered after over-discharging is re-used in the short-distance drive mode to repeat charging/discharging, a decrease in SOC due to discharging can be reduced, and therefore, activation of the fail-safe mechanism can be reduced.

In the present embodiment, W/L preferably falls within a range of 0.50 to 0.80, where "L" represents the inner dimension of the cell chamber 6 in the stacking direction of the electrode plate groups 5 and "W" represents the total thickness of the positive and negative electrode plates 2, 3. The value of W/L shows the size of the clearance between the positive electrode plate 2 and the negative electrode plate 3, i.e., the indicator for amount of the electrolyte entering such a clearance. When the value of W/L falls within a range of 0.50 to 0.80, the charge acceptance of the lead-acid battery 1 is further improved. Thus, even if the lead-acid battery 1 is applied to the idling stop vehicle used in the short-distance drive mode, activation of the fail-safe mechanism can be more effectively reduced.

In the present embodiment, it is preferable that a plurality of ribs for forming a certain clearance between the negative electrode plate 3 and the separator 4 are formed at least at inner parts of the separators 4 each housing a corresponding one of the negative electrode plates 3 arranged respectively on both sides in the electrode plate group 5. This allows the electrolyte to enter the clearance formed between the separator 4 and the negative electrode plates 3 disposed on either side in the electrode plate group 5, thereby further improving the charge acceptance of the lead-acid battery 1.

The foregoing advantages can be achieved as long as the ribs are formed at least at the separators 4 each housing a corresponding one of the negative electrode plates 3 arranged respectively on both sides in the electrode plate group 5. However, a plurality of ribs may be, needless to say, formed at the separators 4 each housing a corresponding one of all of the negative electrode plates 3. If the lead-acid battery 1 includes only a single cell chamber 6, a container of the lead-acid battery 1 may also serve as the cell chamber 6.

Fifth Example

The configuration and advantages of the present invention will be further described below with reference to examples of the present embodiment. Note that the present invention is not limited to these examples.

(1) Formation of Lead-Acid Battery

Lead-acid batteries 1 formed in the present examples are liquid lead-acid batteries having a D23L size specified in JIS D 5301. Seven positive electrode plates 2 and eight negative electrode plates 3 are housed in each cell chamber 6, and each negative electrode plate 3 is housed in a corresponding one of bag-shaped separators 4 made of polyethylene.

Each positive electrode plate 2 was formed in such a manner that lead oxide powder is mixed with sulfuric acid and purified water to prepare a paste and an expanded grid made of a material having the composition of a calcium-based lead alloy is filled with the paste.

Each negative electrode plate 3 was formed in such a manner that an organic additive etc. are added to lead oxide powder, the resultant is mixed with sulfuric acid and purified water to prepare a paste, and an expanded grid made of a material having the composition of a calcium-based lead alloy is filled with the paste.

After the formed positive electrode plates 2 and the formed negative electrode plates 3 were matured and dried, the negative electrode plates 3 were housed respectively in the bag-shaped separators 4 made of polyethylene, and then, the negative electrode plates 3 and the positive electrode plates 2 were alternately stacked on each other. As a result, an electrode plate group 5 in which the seven positive electrode plates 2 and the eight negative electrode plates 3 are stacked on each other with the separator 4 being interposed between adjacent ones of the positive and negative electrode plates 2, 3 was formed. The electrode plate group 5 was housed in each of the six cell chambers 6, and a lead-acid battery 1 in which six cells are connected together in series was formed.

An electrolyte containing diluted sulfuric acid at a density of 1.28 g/cm$^3$ was introduced into the lead-acid battery 1, and then, chemical conversion was performed in a container. As a result, a 12V 48 Ah lead-acid battery 1 was formed.

(2) Evaluation on Characteristics of Lead-Acid Battery (2-1) Evaluation on Characteristic in Short-Distance Drive Mode For the formed lead-acid battery 1, charging/discharging intended for the short-distance drive mode were repeated to evaluate the characteristic of the lead-acid battery in the short-distance drive mode. Note that an environmental temperature was 25° C.±2° C.

(A) After discharging is performed at 9.6 A for 2.5 hours, and then, the lead-acid battery is left uncontrolled for 24 hours.

(B) Discharging is performed at a discharge current of 20 A for 40 seconds.

(C) Charging is performed with a charge voltage of 14.2 V (a limited current of 50 A) for 60 seconds.

(D) After the discharging (B) and the charging (C) are repeated 18 times, discharging is performed at a discharge current of 20 mA for 83.5 hours.

(E) Cycles are repeated 20 times, the discharging (B), the charging (C), and the discharging (D) being counted as a single cycle.

The SOC of the lead-acid battery after 20 cycles was measured, and such a value was taken as the characteristic in the short-distance drive mode.

(2-2) Charge Recovery after Over-Discharging

For the formed lead-acid battery 1, evaluation on the charge recovery after repetition of charging/discharging was made by the following method, supposing that the lead-acid battery 1 recovered after over-discharging is re-used in the short-distance drive mode.

(A) Discharging is performed at a five-hour rate current (a discharge current of 9.8 A) till 10.5 V.

(B) Subsequently, discharging is, with application of a load of 10 W, performed for 14 days under a temperature of 40° C.±2° C., and then, the lead-acid battery in an open circuit state is left uncontrolled for 14 days.

(C) Subsequently, charging is performed with a charge voltage of 15.0 V (a limited current of 25 A) for four hours under a temperature of 25° C.±3° C.

(D) Subsequently, the lead-acid battery is left uncontrolled for equal to or longer than 16 hours in an atmosphere of −15° C.±1° C., and then, discharging is performed at 300 A till 6.0 V.

The duration until the voltage of the lead-acid battery reaches 6.0 V was evaluated as the charge recovery after over-discharging.

Example 5-1

Batteries E1 to E7 were formed, in each of which a surface layer made of a lead alloy containing antimony is formed on a surface of a negative electrode grid and sodium sulfate ($Na_2SO_4$) is added to an electrolyte such that an Na ion content falls within a range of 0.005 to 0.56 mol/L. The characteristic of each battery in the short-distance drive mode and the charge recovery of each battery after over-discharging were evaluated. Note that the negative electrode plates were arranged respectively on both sides in an electrode plate group, and were each housed in a corresponding one of bag-shaped separators.

The negative electrode grid is formed of an expanded grid of Pb-1.2Sn-0.1Ca, and the surface layer is made of Pb-3mass%Sb foil. Moreover, a positive electrode grid is formed of an expanded grid of Pb-1.6Sn-0.1Ca, and no surface layer is formed on the positive electrode grid.

Table 11 shows the evaluation results of each characteristic. Note that a battery E8 in which no surface layer is formed on a surface of a negative electrode grid and a battery E9 in which negative electrode grids are not housed respectively in bag-shaped separators, but positive electrode grids are housed respectively in the bag-shaped separators were formed as comparative examples.

ing state, a decrease in SOC due to discharging can be reduced, and therefore, activation of the fail-safe mechanism can be reduced.

In particular, the batteries E3 to E5 whose Na ion content in the electrolyte falls within a range of 0.03 to 0.28 mol/L exhibit excellent characteristics because the SOC indicating the characteristic in the short-distance drive mode is equal to or higher than 74%, and the duration indicating the recovery after over-discharging is equal to or longer than 3.0 minutes. These batteries have a preferable performance when the idling stop vehicle is used in the short-distance drive mode.

On the other hand, the battery E7 whose Na ion content in the electrolyte is 0.56 mol/L shows that the SOC indicating the characteristic in the short-distance drive mode is a low value of 59%. This may be because the sodium ions in the electrolyte block charge reaction.

The battery E1 whose Na ion content in the electrolyte is 0.005 mol/L shows that the duration indicating the recovery

TABLE 11

| | NEGATIVE ELECTRODE PLATE | | | SEPARATOR | | CHARACTERISTIC IN SHORT-DISTANCE DRIVE MODE SOC (%) | RECOVERY AFTER OVER-DISCHARGING DURATION (MINUTES) |
|---|---|---|---|---|---|---|---|
| | Na ION CONTENT (mol/L) | NEGATIVE ELECTRODE GRID | SURFACE LAYER | SHAPE | MEMBER TO BE HOUSED | | |
| BATTERY E1 | 0.005 | Pb—Sn—Ca | Pb—Sb | BAG | NEGATIVE ELECTRODE PLATE | 73 | 1.5 |
| BATTERY E2 | 0.01 | Pb—Sn—Ca | Pb—Sb | BAG | NEGATIVE ELECTRODE PLATE | 73 | 2.5 |
| BATTERY E3 | 0.03 | Pb—Sn—Ca | Pb—Sb | BAG | NEGATIVE ELECTRODE PLATE | 74 | 2.9 |
| BATTERY E4 | 0.11 | Pb—Sn—Ca | Pb—Sb | BAG | NEGATIVE ELECTRODE PLATE | 75 | 3.0 |
| BATTERY E5 | 0.28 | Pb—Sn—Ca | Pb—Sb | BAG | NEGATIVE ELECTRODE PLATE | 74 | 3.0 |
| BATTERY E6 | 0.45 | Pb—Sn—Ca | Pb—Sb | BAG | NEGATIVE ELECTRODE PLATE | 70 | 3.0 |
| BATTERY E7 | 0.56 | Pb—Sn—Ca | Pb—Sb | BAG | NEGATIVE ELECTRODE PLATE | 59 | 2.9 |
| BATTERY E8 | 0.11 | Pb—Sn—Ca | NOT FORMED | BAG | NEGATIVE ELECTRODE PLATE | 57 | 2.9 |
| BATTERY E9 | 0.11 | Pb—Sn—Ca | Pb—Sb | BAG | POSITIVE ELECTRODE PLATE | 56 | 2.5 |

As will be seen from Table 11, the batteries E2 to E6 whose Na ion content in the electrolyte falls within a range of 0.01 to 0.45 mol/L show that the SOC indicating the characteristic in the short-distance drive mode is equal to or higher than 70% and that the duration indicating the recovery after over-discharging is equal to or longer than 2.9 minutes. In the lead-acid batteries showing such values, even if the idling stop vehicle is used in the short-distance drive mode, a sufficient life characteristic can be maintained, and activation of the fail-safe mechanism can be reduced. In addition, even if the idling stop vehicle is re-used in the short-distance drive mode after the lead-acid battery is temporarily in an over-dischargafter over-discharging is a low value of 1.5 minutes. This may be because the recovery after over-discharging is lowered.

The battery E8 in which no surface layer is formed on the negative electrode grid shows that the SOC indicating the characteristic in the short-distance drive mode is an extremely-low value of 57%. This may be because no lead alloy foil containing Sb is formed on the surface of the negative electrode grid, and therefore, a hydrogen overvoltage does not decrease and the charge acceptance is low.

The battery E9 in which each positive electrode plate is housed in a corresponding one of the bag-shaped separators shows that the SOC indicating the characteristic in the short-distance drive mode is a low value of 56%. This may be because of the following reasons. Since the negative electrode plates arranged respectively on both sides in the electrode plate group are not housed respectively in the bag-shaped separators, the negative electrode plates are pressed against inner walls of the cell chamber. As a result, the charge acceptance is lowered due to a lack of electrolyte entering the clearance on the side close to the inner wall of the cell chamber relative to the negative electrode plate.

tion of the electrode plate groups housed respectively in the cell chambers 6 is represented by "L," the thickness of the positive electrode plate 2 is represented by "W1," the thickness of the negative electrode plate 3 is represented by "W2," and the total thickness (W1×7+W2×8) of the positive electrode plates 2 and the negative electrode plates 3 is represented by "W."

Table 12 shows the evaluation results of each characteristic.

TABLE 12

| | NEGATIVE ELECTRODE PLATE | | | SEPARATOR | | THICKNESS RATIO OF ELECTRODE PLATES TO CELL CHAMBER W/L | CHARACTERISTIC IN SHORT-DISTANCE DRIVE MODE SOC (%) | RECOVERY AFTER OVER-DISCHARGING DURATION (MINUTES) |
|---|---|---|---|---|---|---|---|---|
| | Na ION CONTENT (mol/L) | GRID COMPOSITION | FOIL COMPOSITION | SHAPE | MEMBER TO BE HOUSED | | | |
| BATTERY E10 | 0.11 | Pb—Sn—Ca | Pb—Sb | BAG | NEGATIVE ELECTRODE PLATE | 0.45 | 67 | 2.7 |
| BATTERY E11 | 0.11 | Pb—Sn—Ca | Pb—Sb | BAG | NEGATIVE ELECTRODE PLATE | 0.50 | 71 | 2.8 |
| BATTERY E12 | 0.11 | Pb—Sn—Ca | Pb—Sb | BAG | NEGATIVE ELECTRODE PLATE | 0.60 | 74 | 2.8 |
| BATTERY E13 | 0.11 | Pb—Sn—Ca | Pb—Sb | BAG | NEGATIVE ELECTRODE PLATE | 0.65 | 75 | 3.0 |
| BATTERY E14 | 0.11 | Pb—Sn—Ca | Pb—Sb | BAG | NEGATIVE ELECTRODE PLATE | 0.70 | 74 | 3.0 |
| BATTERY E15 | 0.11 | Pb—Sn—Ca | Pb—Sb | BAG | NEGATIVE ELECTRODE PLATE | 0.80 | 71 | 2.7 |
| BATTERY E16 | 0.11 | Pb—Sn—Ca | Pb—Sb | BAG | NEGATIVE ELECTRODE PLATE | 0.85 | 66 | 2.5 |

Based on the foregoing results, a lead-acid battery which exhibits excellent charge recovery after over-discharging, which reduces activation of a fail-safe mechanism, and which is adaptable to an idling stop vehicle used in a short-distance drive mode can be achieved in such a manner that a surface layer made of a lead alloy containing antimony is formed on a surface of a negative electrode grid containing no antimony, that negative electrode plates each housed in a corresponding one of bag-shaped separators are arranged on both sides in an electrode plate group, and that an electrolyte contains sodium ions at a range of 0.01 to 0.45 mol/L and more preferably a range of 0.03 to 0.28 mol/L.

Example 5-2

In order to further improve the charge acceptance, batteries E10 to E16 were formed from the battery E4 formed in Example 5-1 such that W/L varies within a range of 0.45 to 0.85, where "L" represents the inner dimension of the cell chamber in the stacking direction of the electrode plate groups and "W" represents the total thickness of positive and negative electrode plates. The characteristic of each battery in the short-distance drive mode and the recovery of each battery after over-discharging were evaluated. The battery E13 is the same as the battery E4 formed in Example 5-1.

FIG. 3 is the cross-sectional view of the cell chamber 6. The inner dimension of the cell chamber 6 in the stacking direc- As will be seen from Table 12, the batteries E11 to E15 whose W/L falls within a range of 0.50 to 0.80 show that the SOC indicating the characteristic in the short-distance drive mode is equal to or higher than 71%. In the lead-acid batteries showing such values, even if the idling stop vehicle is used in the short-distance drive mode, a sufficient life characteristic can be maintained, and activation of the fail-safe mechanism can be reduced. In particular, the batteries E12 to E14 whose W/L falls within a range of 0.60 to 0.70 show that the SOC indicating the characteristic in the short-distance drive mode is equal to or higher than 74%. These batteries have a preferable performance when the idling stop vehicle is used in the short-distance drive mode.

On the other hand, the battery E10 whose W/L is 0.45 shows that the SOC indicating the characteristic in the short-distance drive mode is a low value of 67%. This may be because the charge acceptance is lowered due to a lack of active material.

The battery E16 whose W/L is 0.85 shows that the SOC indicating the characteristic in the short-distance drive mode is a low value of 66%. This may be because the charge acceptance is lowered due to a lack of electrolyte entering the clearance between adjacent ones of the members in the battery E16.

All of the batteries E10 to E16 show that the duration indicating the recovery after over-discharging is a high value of equal to or longer than 2.5 minutes. This may be because Na ions are contained in the electrolyte at a content of 0.11 mol/L, and therefore, the effect of improving the charge recovery after over-discharging by the Na ions is exhibited.

Based on the foregoing results, the charge acceptance can be further improved in such a manner that the W/L is set within a range of 0.50 to 0.80 and more preferably a range of 0.60 to 0.70. Thus, even if the lead-acid battery is applied to the idling stop vehicle used in the short-distance drive mode, activation of the fail-safe mechanism can be more effectively reduced.

Example 5-3

Next, in order to further improve the charge acceptance, a battery E17 was formed from the battery E4 formed in Example 5-1 such that a plurality of ribs 15 for forming a certain clearance between a negative electrode plate 3 and a bag-shaped separator 4 housing the negative electrode plate 3 are formed at an inner part of the separator 4 as illustrated in FIG. 3. Note that a battery E18 in which ribs 15 are formed so as to face positive electrode plates 2, a battery E19 in which each positive electrode plate 2 is housed in a corresponding one of bag-shaped separators 4 and ribs 15 are formed so as to face negative electrode plates 3, and a battery E20 in which plate-shaped separators are used instead of bag-shaped separators 4 and ribs 15 are formed so as to face negative electrode plates 3 were formed as comparative examples. The height of the rib 15 was 0.2 mm, and was integrally formed with the separator 4.

Table 13 shows the evaluation results of each characteristic.

TABLE 13

| | NEGATIVE ELECTRODE PLATE | | | | | CHARACTERISTIC IN SHORT-DISTANCE DRIVE MODE SOC (%) | RECOVERY AFTER OVER-DISCHARGING DURATION (MINUTES) |
|---|---|---|---|---|---|---|---|
| | Na ION CONTENT (mol/L) | GRID COMPOSITION | FOIL COMPOSITION | SEPARATOR SHAPE | MEMBER TO BE HOUSED | RIB | |
| BATTERY E17 | 0.11 | Pb—Sn—Ca | Pb—Sb | BAG | NEGATIVE ELECTRODE PLATE | NEGATIVE ELECTRODE SIDE | 75 | 3.0 |
| BATTERY E18 | 0.11 | Pb—Sn—Ca | Pb—Sb | BAG | NEGATIVE ELECTRODE PLATE | POSITIVE ELECTRODE SIDE | 63 | 3.0 |
| BATTERY E19 | 0.11 | Pb—Sn—Ca | Pb—Sb | BAG | POSITIVE ELECTRODE PLATE | NEGATIVE ELECTRODE SIDE | 54 | 2.5 |
| BATTERY E20 | 0.11 | Pb—Sn—Ca | Pb—Sb | PLATE | — | NEGATIVE ELECTRODE SIDE | 57 | 2.7 |

As will be seen from Table 13, the battery E17 in which the ribs are formed at the inner part of each separator so as to face the negative electrode plates shows that the SOC indicating the characteristic in the short-distance drive mode is 75%. In the lead-acid battery showing such values, even if the idling stop vehicle is used in the short-distance drive mode, a sufficient life characteristic can be maintained, and activation of the fail-safe mechanism can be reduced.

On the other hand, any of the battery E18 in which the ribs are formed so as to face the positive electrode plates, the battery E19 in which each positive electrode plate is housed in a corresponding one of the bag-shaped separators and the ribs are formed so as to face the negative electrode plates, and the battery E20 in which the plate-shaped separators are used and the ribs are formed so as to face the negative electrode plates shows that the SOC indicating the characteristic in the short-distance drive mode is a low value of equal to or lower than 63%. This may be because of the following reasons. When the negative electrode plates arranged respectively on both sides in the electrode plate group are pressed against the inner walls of the cell chamber, no clearance was formed between the negative electrode plate and the cell chamber, and the charge acceptance is lowered due to a lack of electrolyte entering such a clearance.

All of the batteries E17 to E20 show that the duration indicating the recovery after over-discharging is a high value of equal to or longer than 2.5 minutes. This may be because Na ions are contained in the electrolyte at a content of 0.11 mol/L, and therefore, the effect of improving the charge recovery after over-discharging by the Na ions is exhibited.

Based on the foregoing results, the charge acceptance of the lead-acid battery can be further improved in such a manner that each negative electrode plate is housed in a corresponding one of the bag-shaped separators and the ribs for forming a certain clearance between the negative electrode plate and the separator are formed at the inner part of the separator. Thus, even if the lead-acid battery is applied to the idling stop vehicle used in the short-distance drive mode, activation of the fail-safe mechanism can be more effectively reduced.

As described above, the present invention has been described with reference to the preferable examples. However, such description does not lead to any limitations, and needless to say, various modifications may be made to the present invention.

INDUSTRIAL APPLICABILITY

The present invention is useful for lead-acid batteries used for idling stop vehicles.

DESCRIPTION OF REFERENCE CHARACTERS

1 Lead-Acid Battery
2 Positive Electrode Plate
3 Negative Electrode Plate
4 Separator 5 Electrode Plate Group
6 Cell Chamber
7 Positive Electrode Strap
8 Negative Electrode Strap
9, 10 Ear Part
11 Connector
12 Positive Electrode Terminal
13 Negative Electrode Terminal
14 Cover
15 Rib

The invention claimed is:

1. A lead-acid battery in which at least one electrode plate group formed such that a plurality of positive electrode plates and a plurality of negative electrode plates are stacked on each other with a separator being interposed between adjacent ones of the positive and negative electrode plates is housed in at least one cell chamber together with an electrolyte,
wherein each positive electrode plate includes:
a positive electrode grid made of lead or a lead alloy containing no antimony,
a positive electrode surface layer formed on a surface of the positive electrode grid and made of a lead alloy containing antimony, and
a positive electrode active material with which the positive electrode grid is filled and which is made of lead oxide,
each negative electrode plate includes:
a negative electrode grid made of lead or a lead alloy containing no antimony,
a negative electrode surface layer formed on a surface of the negative electrode grid and made of a lead alloy containing antimony, and
a negative electrode active material with which the negative electrode grid is filled and which is made of lead oxide,
an area PS of the positive electrode surface layer on the surface of the positive electrode grid is larger than an area NS of the negative electrode surface layer on the surface of the negative electrode grid,
NS/PS falls within a range of 0.3-0.8, and
the positive and negative electrode surface layers are made of a Pb—Sb based alloy containing antimony at a content of 1.0 to 5.0 mass %.

2. The lead-acid battery of claim 1, wherein
the content of the antimony is higher in the negative electrode surface layer than in the positive electrode surface layer.

3. The lead-acid battery of claim 1, wherein
strands of the positive electrode grid have no twist, and at least one strand of the negative electrode grid has twists.

4. A lead-acid battery in which at least one electrode plate group formed such that a plurality of positive electrode plates and a plurality of negative electrode plates are stacked on each other with a separator being interposed between adjacent ones of the positive and negative electrode plates is housed in at least one cell chamber together with an electrolyte,
wherein each positive electrode plate includes:
a positive electrode grid made of lead or a lead alloy containing no antimony, and
a positive electrode active material with which the positive electrode grid is filled and which is made of lead oxide,
each negative electrode plate includes:
a negative electrode grid made of lead or a lead alloy containing no antimony,
a surface layer formed on a surface of the negative electrode grid and made of a lead alloy containing antimony, and
a negative electrode active material with which the negative electrode grid is filled and which is made of lead oxide,
a mass ratio $M_S/M_P$ falls within a range of 0.50 to 0.74, where $M_P$ represents a mass of the positive electrode active material per cell chamber, and $M_S$ represents a mass of sulfuric acid contained in the electrolyte, and
the surface layer is made of a Pb—Sb based alloy containing antimony at a content of 1.0 to 5.0 mass %.

5. The lead-acid battery of claim 4, wherein
the mass ratio $M_S/M_P$ falls within a range of 0.57 to 0.70.

6. The lead-acid battery of claim 4, wherein
W/L falls within a range of 0.50 to 0.80, where L represents an inner dimension of the cell chamber in a stacking direction of the electrode plate group, and W represents a total thickness of the positive and negative electrode plates.

7. The lead-acid battery of claim 6, wherein
the W/L falls within a range of 0.60 to 0.70.

8. The lead-acid battery of claim 4, wherein
a density of the positive electrode active material falls within a range of 3.6 to 4.8 g/ml.

9. The lead-acid battery of claim 8, wherein
the density of the positive electrode active material falls within a range of 3.9 to 4.5 g/ml.

10. The lead-acid battery of claim 4, wherein
a total pore volume of the positive electrode active material falls within a range of 0.06 to 0.18 ml/g.

11. The lead-acid battery of claim 10, wherein
the total pore volume of the positive electrode active material falls within a range of 0.09 to 0.15 ml/g.

12. The lead-acid battery of claim 4, wherein
the positive electrode plates of the electrode plate group are connected together in parallel by an electrode-plate connection plate extending in a stacking direction of the positive electrode plates, and the negative electrode plates of the electrode plate group are connected together in parallel by an electrode-plate connection plate extending in a stacking direction of the negative electrode plates,
the electrode-plate connection plates of adjacent electrode plate groups are connected together in series through a connector connected to the electrode-plate connection plates of the adjacent electrode plate groups, and
the electrode-plate connection plates and the connector are made of a lead alloy containing no antimony and containing tin.

13. The lead-acid battery of claim 12, wherein
each of the electrode-plate connection plates of the electrode plate groups arranged respectively at both ends of the lead-acid battery is connected to a corresponding one of external terminals through a corresponding one of poles, and
the poles are made of a lead alloy containing no antimony and containing tin.

* * * * *